(12) United States Patent
Ostrovsky et al.

(10) Patent No.: US 12,520,157 B2
(45) Date of Patent: *Jan. 6, 2026

(54) COMMUNICATION ENABLED CIRCUIT BREAKERS

(71) Applicant: LEVITON MANUFACTURING CO., INC., Melville, NY (US)

(72) Inventors: Michael Ostrovsky, Brooklyn, NY (US); Michael Kamor, Melville, NY (US); Adam Kevelos, Plainville, NY (US); Alfred J. Lombardi, Syosset, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,310

(22) Filed: Jan. 20, 2023

(65) Prior Publication Data

US 2023/0164568 A1    May 25, 2023

Related U.S. Application Data

(63) Continuation of application No. 16/485,486, filed as application No. PCT/US2018/019859 on Feb. 27, 2018, now Pat. No. 11,606,695.

(Continued)

(51) Int. Cl.
*G01R 31/327*      (2006.01)
*G01R 31/74*       (2020.01)
(Continued)

(52) U.S. Cl.
CPC ........ *H04W 12/50* (2021.01); *G01R 31/3277* (2013.01); *G01R 31/74* (2020.01);
(Continued)

(58) Field of Classification Search
CPC ........... G01R 31/74; H02H 3/10; H02H 7/263
See application file for complete search history.

(56) References Cited

U.S. PATENT DOCUMENTS

| | | | |
|---|---|---|---|
| 5,223,795 A | 6/1993 | Blades | |
| 5,436,604 A | 7/1995 | Mrenna | |

(Continued)

FOREIGN PATENT DOCUMENTS

| | | |
|---|---|---|
| EP | 3002648 B1 | 6/2021 |
| WO | 2011091429 A2 | 7/2011 |
| WO | 2014018434 A2 | 1/2014 |

OTHER PUBLICATIONS

Allen-Bradley, Rockwell Software Rockwell Automation, "Supplementary Protectors/Miniature circuit breakers" Catalog Nos. 1492-SP Series C, Apr. 2011, p. 31.

(Continued)

*Primary Examiner* — Nabil H Syed
(74) *Attorney, Agent, or Firm* — KDW Firm PLLC

(57) ABSTRACT

Communication enabled circuit breakers are described. Methods associated with such communication enabled circuit breakers are also described. The communication enabled circuit breakers may include one or more current sensors. The one or more current sensors may be disposed in a clip. The clip may be coupled to a line side phase connection, and the clip may be shielded to attenuate signals.

22 Claims, 13 Drawing Sheets

Related U.S. Application Data

(60) Provisional application No. 62/612,654, filed on Jan. 1, 2018, provisional application No. 62/612,657, filed on Jan. 1, 2018, provisional application No. 62/612,656, filed on Jan. 1, 2018, provisional application No. 62/500,051, filed on May 2, 2017, provisional application No. 62/465,046, filed on Feb. 28, 2017.

(51) Int. Cl.
| | |
|---|---|
| G05B 13/02 | (2006.01) |
| G05B 19/042 | (2006.01) |
| G06F 8/65 | (2018.01) |
| G08B 5/36 | (2006.01) |
| G08C 17/02 | (2006.01) |
| H01H 71/04 | (2006.01) |
| H02H 1/00 | (2006.01) |
| H02H 3/10 | (2006.01) |
| H02H 7/26 | (2006.01) |
| H04L 9/08 | (2006.01) |
| H04L 12/28 | (2006.01) |
| H04L 67/00 | (2022.01) |
| H04Q 9/00 | (2006.01) |
| H04W 4/80 | (2018.01) |
| H04W 12/03 | (2021.01) |
| H04W 12/0471 | (2021.01) |
| H04W 12/50 | (2021.01) |
| H04W 76/11 | (2018.01) |
| H04W 76/14 | (2018.01) |
| G06F 7/58 | (2006.01) |

(52) U.S. Cl.
CPC ....... *G05B 13/028* (2013.01); *G05B 19/0426* (2013.01); *G06F 8/65* (2013.01); *G08B 5/36* (2013.01); *G08C 17/02* (2013.01); *H01H 71/04* (2013.01); *H02H 1/0007* (2013.01); *H02H 1/0061* (2013.01); *H02H 1/0092* (2013.01); *H02H 3/10* (2013.01); *H02H 7/263* (2013.01); *H04L 9/0841* (2013.01); *H04L 12/2816* (2013.01); *H04L 67/34* (2013.01); *H04Q 9/00* (2013.01); *H04W 4/80* (2018.02); *H04W 12/03* (2021.01); *H04W 12/0471* (2021.01); *H04W 76/11* (2018.02); *H04W 76/14* (2018.02); *G05B 2219/25112* (2013.01); *G06F 7/588* (2013.01); *G08C 2201/93* (2013.01); *H04L 2209/805* (2013.01); *H04Q 2209/43* (2013.01)

(56) References Cited

U.S. PATENT DOCUMENTS

| | | |
|---|---|---|
| 5,467,286 A | 11/1995 | Pyle |
| 5,486,755 A | 1/1996 | Horan |
| 5,629,869 A | 5/1997 | Johnson |
| 5,805,813 A | 9/1998 | Schweitzer, III |
| 6,034,586 A | 3/2000 | Runyan |
| 6,055,144 A | 4/2000 | Reid |
| 6,195,243 B1 | 2/2001 | Spencer |
| 6,246,928 B1 | 6/2001 | Louis |
| 6,292,717 B1 | 9/2001 | Alexander |
| 6,295,190 B1 | 9/2001 | Rinaldi |
| 6,473,794 B1 | 10/2002 | Guheen |
| 6,628,496 B2 | 9/2003 | Montjean |
| 7,493,221 B2 | 2/2009 | Caggiano |
| 7,546,214 B2 | 6/2009 | Rivers, Jr. |
| 7,558,038 B2 | 7/2009 | Wiese |
| 7,719,257 B2 | 5/2010 | Robarge |
| 8,463,453 B2 | 6/2013 | Parsons, Jr. |
| 8,681,463 B2 | 3/2014 | Franks |
| 8,719,123 B2 | 5/2014 | Rohrbaugh |
| 9,432,214 B2 | 8/2016 | Lal |
| 9,438,026 B2 | 9/2016 | Franks |
| 9,715,796 B2 | 7/2017 | Reid |
| 9,853,458 B1 | 12/2017 | Bell |
| 10,063,592 B1 | 8/2018 | McClintock |
| 2002/0075616 A1 | 6/2002 | Montjean |
| 2003/0086228 A1 | 5/2003 | Papallo |
| 2003/0167373 A1 | 9/2003 | Winters |
| 2005/0116814 A1* | 6/2005 | Rodgers ............ H02J 3/14 340/538 |
| 2005/0168891 A1 | 8/2005 | Nilman-Johansson |
| 2005/0225909 A1* | 10/2005 | Yoshizaki ............ H02H 3/33 361/42 |
| 2006/0050870 A1 | 3/2006 | Kimmel |
| 2006/0087783 A1 | 4/2006 | Holley |
| 2006/0238932 A1 | 10/2006 | Westbrock |
| 2007/0143043 A1 | 6/2007 | Wafer |
| 2007/0188954 A1 | 8/2007 | Wiese |
| 2007/0194942 A1 | 8/2007 | Darr |
| 2008/0079437 A1 | 4/2008 | Robarge |
| 2008/0142486 A1 | 6/2008 | Vicente |
| 2008/0209429 A1 | 8/2008 | Van Riel |
| 2008/0231485 A1 | 9/2008 | Newlin |
| 2008/0255782 A1 | 10/2008 | Bilac |
| 2009/0206059 A1* | 8/2009 | Kiko ............ G05F 1/66 218/143 |
| 2010/0057387 A1 | 3/2010 | Kagan |
| 2011/0150482 A1 | 6/2011 | Furusawa |
| 2011/0279933 A1 | 11/2011 | Campolo |
| 2012/0098347 A1 | 4/2012 | Beierschmitt |
| 2012/0123762 A1* | 5/2012 | Studer ............ H02H 1/06 361/93.6 |
| 2012/0140431 A1 | 6/2012 | Faxvog |
| 2012/0262093 A1 | 10/2012 | Recker et al. |
| 2013/0029596 A1 | 1/2013 | Preston |
| 2013/0329331 A1* | 12/2013 | Erger ............ H01H 71/04 361/102 |
| 2014/0134951 A1 | 5/2014 | Paulson |
| 2014/0146431 A1 | 5/2014 | Franks |
| 2014/0193294 A1 | 7/2014 | Kain |
| 2014/0197856 A1 | 7/2014 | Ostrovsky |
| 2014/0211345 A1* | 7/2014 | Thompson ............ H01H 9/548 335/11 |
| 2014/0300486 A1 | 10/2014 | Hummel |
| 2014/0340222 A1 | 11/2014 | Thornton |
| 2015/0162157 A1 | 6/2015 | Luebke |
| 2015/0168487 A1* | 6/2015 | Parker ............ H02H 1/0061 702/58 |
| 2015/0188975 A1 | 7/2015 | Hansen |
| 2015/0207301 A1 | 7/2015 | Franks |
| 2015/0296599 A1 | 10/2015 | Recker |
| 2015/0338472 A1* | 11/2015 | Nuqui ............ G01R 31/50 324/764.01 |
| 2016/0099749 A1 | 4/2016 | Bennett |
| 2016/0100310 A1 | 4/2016 | Lee |
| 2016/0163186 A1 | 6/2016 | Davidson |
| 2016/0181036 A1 | 6/2016 | Langdon |
| 2016/0225562 A1 | 8/2016 | Franks |
| 2016/0231375 A1 | 8/2016 | Roemer |
| 2016/0282828 A1 | 9/2016 | Jauquet |
| 2017/0005462 A1 | 1/2017 | Williams |
| 2017/0064798 A1 | 3/2017 | Economy |
| 2017/0163023 A1 | 6/2017 | Niehoff |
| 2018/0129801 A1 | 5/2018 | Cambou |
| 2018/0278724 A1 | 9/2018 | Erdelyi |
| 2020/0264234 A1 | 8/2020 | Miller |

OTHER PUBLICATIONS

Elmark, "Technical Specification—Minature circuit breakers (MCB) C60DC Series", pp. 3 and 4.
International Search Report and Written Opinion for Application No. PCT/US2018/019852 mailed on May 15, 2018, 13 pages.
International Search Report and Written Opinion for Application No. PCT/US2018/019856, mailed on May 11, 2018, 14 pages.

(56) References Cited

OTHER PUBLICATIONS

International Search Report and Written Opinion for Application No. PCT/US2018/019857, mailed on Jun. 27, 2018, 14 pages.
International Search Report and Written Opinion for Application No. PCT/US2018/019859, mailed on May 16, 2018, 11 pages.
Techterms, "Overwrite", Techterms.com/definition/overwrite, Feb. 29, 2012.

* cited by examiner

1200

Storage Medium or
Non-Transitory Storage Medium
1300

Processor Executable Instructions
1302
(Logic For 1100/1200)

FIG. 13

COMMUNICATION ENABLED CIRCUIT BREAKERS

CROSS-REFERENCE TO RELATED APPLICATIONS

This application is a continuation of U.S. application Ser. No. 16/485,486, filed Aug. 13, 2019, which is a United States National Phase filing of International Application No. PCT/US2018/019859, filed Feb. 27, 2018, which claims the benefit of U.S. Provisional Application Ser. No. 62/465,046, filed Feb. 28, 2017, entitled "Wireless Communication Enabled Circuit Breakers and Circuit Breaker Panels;" U.S. Provisional Application Ser. No. 62/500,051, filed May 2, 2017, entitled "Wireless Communication Enabled Circuit Breakers and Circuit Breaker Panels;" U.S. Provisional Application Ser. No. 62/612,654, filed Jan. 1, 2018, entitled "Secure Communication for Commissioning and Decommissioning Circuit Breakers and Panel System;" U.S. Provisional Application Ser. No. 62/612,656, filed Jan. 1, 2018, entitled "Communication Enabled Circuit Breakers;" and U.S. Provisional Application Ser. No. 62/612,657, filed Jan. 1, 2018, entitled "Communication Enabled Circuit Breakers;" which applications are incorporated herein by reference in their entirety.

FIELD OF THE DISCLOSURE

The present invention relates generally to circuit breakers. More particularly, the present invention relates to communication enabled circuit breakers and circuit breaker panels that house circuit breakers.

BACKGROUND OF THE DISCLOSURE

Circuit breakers provide protection in electrical systems by disconnecting a load from a power supply based on certain fault conditions, e.g. ground fault, arc fault, overcurrent. In general, circuit breakers monitor characteristics of the electrical power supplied to branch circuits. The circuit breakers function to automatically interrupt, open, 'trip' or 'break' the connection between the power supply and a branch circuit when fault conditions (e.g., arc faults, ground faults, and unsafe overcurrent levels) are detected on the supplied branch, e.g. automatically open a switch to disconnect the branch from the power supply when such fault conditions are detected.

Existing circuit breaker panels and circuit breakers housed by such panels may provide limited information to electricians and consumers about the nature of the fault conditions observed by circuit breakers. For example, electricians and consumers may be able to determine that a circuit breaker has tripped by visual inspection of the circuit breaker or if power is lost on one or more loads. The visual inspection of the circuit breaker generally requires observing an operating switch associated with the circuit breaker. The operating switch of the circuit breaker is provided to allow for manually opening and closing contacts of the circuit breaker. The operating switch is also typically used to reset the circuit breaker after the circuit breaker has tripped due to a detected fault condition.

BRIEF DESCRIPTION OF THE DRAWINGS

FIG. 13 illustrates a storage medium according to an exemplary embodiment.

DETAILED DESCRIPTION

Figure 1:
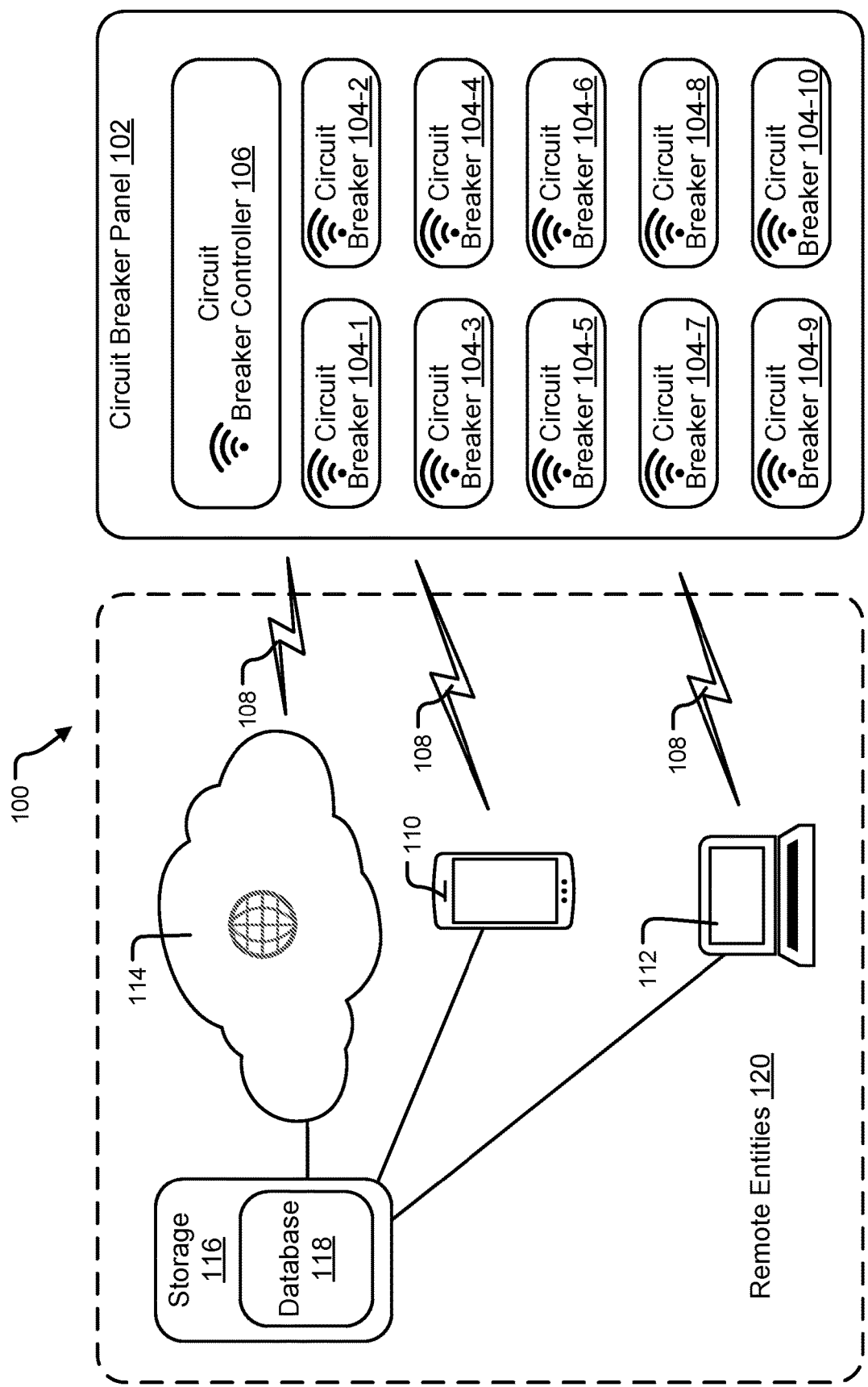
FIG. 1 illustrates a communication enabled circuit breaker and panel system in accordance with an exemplary embodiment.

Communication enabled circuit breakers and circuit breaker panels are provided. Methods associated with such communication enabled circuit breakers and circuit breaker panels are also provided.

In general, the embodiments detailed herein provide a communication enabled circuit breaker including a current sensor arranged to measure current within the breaker. More specifically, the current sensor can be arranged to measure current between a line side phase and neutral connections and a load side phase and neutral connections of the breaker. Additionally, the breaker can include communication components configured to transmit information including indications of the measured current. Such a breaker can be advantageous over current breakers. For example, the capability to meter power consumption (and power production using a Photovoltaic Array (PV)) and gather related information associated with branch circuits and loads coupled to circuit breaker panels and circuit breakers housed within the panels may be advantageous. Such related information may be useful to identify faulty wiring before such faulty wiring causes a circuit breaker to trip. In addition, the related information may be useful in identifying loads (e.g., HVAC systems, refrigerators, televisions, and computers) that may cause circuit breakers to trip at some time in the future. Furthermore, such related information may be useful in tracking power usage of loads coupled to individual branch circuits.

In some implementations, the communication enabled circuit breaker tracks electrical/power usage and consumption on a branch circuit coupled to the communication enabled circuit breaker. This information may be conveyed to a communication enabled circuit breaker panel (or a controller within the panel) for dissemination to an external entity, such as the Internet cloud, a computing device and/or mobile device. For example, a circuit breaker controller housed in the circuit breaker panel may disseminate the information observed by the communication enabled circuit breaker. The electrical/power usage and consumption information gathered by the communication enabled circuit breaker may be aggregated by the circuit breaker controller and/or the external entity to provide historical data. The historical data may be used to predict fault conditions on a branch circuit and/or one or more loads coupled to the branch circuit.

It is noted, that the present disclosure often uses examples of communication enabled circuit breakers and panels, which may be wirelessly coupled. It is to be appreciated that the examples given herein can be implemented using wired communication technologies (e.g., Ethernet, RS232, USB, or the like) instead of wireless communication technologies. As such, the use of the term "wireless" when referring to the communication technologies that may be implemented by the breakers and/or panels is not intended to be limiting to breakers and panels which only communicate wirelessly. Furthermore, system components can be referred to as "wireless" without implying that the elements recited thereto are devoid of wires or physical conductors/conductive paths. Lastly, the present disclosure could implement a breaker and panel system where the breakers communicate with the panel via a wired link without departing from the spirit and scope of the disclosure.

FIG. 1 illustrates a communication enabled circuit breaker and panel system 100 in accordance with an exemplary embodiment. The communication enabled circuit breaker and panel system 100 includes a circuit breaker panel 102. The circuit breaker panel 102 may include any number of communication enabled circuit breakers 104-$n$, where n is a positive integer. For example, system 100 is depicted including communication enabled circuit breakers 104-1, 104-2, 104-3, 104-4, 104-5, 104-6, 104-7, 104-8, 104-9 and 104-10. It is noted, system 100 is depicted with communication enabled circuit breaker 104-1 to 104-10 for purposes of clarity and not limitation. For example, system 100 can include panel 102 having any number (e.g., 1, 2, 3, 4, or more) of communication enabled circuit breakers 104-$n$. Additionally, panel 102 may include both communication enabled circuit breakers (e.g., 104-1 to 104-10) as well as conventional circuit breakers (not shown).

Additionally, although each of the communication enabled circuit breakers 104-1 to 104-10 are labeled as breaker 104, it is to be understood that communication enabled circuit breakers 104-1 to 104-10 are not necessarily identical. For example, communication enabled circuit breaker 104-1 may be a ground fault circuit interrupter (GFCI) device; communication enabled circuit breaker 104-2 may be an arc fault circuit interrupter (AFCI) device; communication enabled circuit breaker 104-3 may be a conventional overcurrent circuit breaker, an overcurrent hydraulic-magnetic circuit breaker, an overcurrent thermal magnetic circuit breaker, or the like; communication enabled circuit breaker 104-4 may include both GFCI and AFCI functionalities. Furthermore, each of the communication enabled ireless circuit breakers 104-1 to 104-10 may be rated for a predefined trip amperage or overcurrent state, and not necessarily the same predefined trip amperage or overcurrent state.

Furthermore, communication enabled circuit breakers 104-1 to 104-10 may be shaped and sized differently. For example, communication enabled circuit breaker 104-1 may be a double pole circuit breaker having a 2 inch width; communication enabled circuit breaker 104-2 may be a single circuit breaker having a 1 inch width; communication enabled circuit breaker 104-3 may be a circuit breaker having a ¾ inch width; communication enabled circuit breaker 104-4 may be a circuit breaker having a 1 & ½ inch width; etc. The width of the communication enabled circuit breakers 104-1 to 104-10 refers to the shorter side of the generally rectangular visible face of the communication enabled circuit breakers 104-1 to 104-10 once it is installed in the circuit breaker panel 102.

Each of the communication enabled circuit breakers 104-1 to 104-10 may include communication components (refer to FIGS. 2A and 3), which is some examples can be wireless. Such communication components associated with each of the communication enabled circuit breakers 104-1 to 104-10 may enable the communication enabled circuit breakers 104-1 to 104-10 to communicate (e.g., send and/or receive information elements including data, indications of operating conditions, instructions, updated fault interruption instructions, or the like) using any of a variety of communication standards. For example, in the case of wireless communication, the communication enabled circuit breakers 104-1 to 104-10 can include wireless communication components arranged to communicate via a wireless communication protocol, e.g., Bluetooth® Low Energy (BLE), thus enabling the communication enabled circuit breakers 104-1 to 104-10 to communicate using BLE communication schemes. In the case of wired communication, the communication enabled circuit breakers 104-1 to 104-10 can include wired communication components arranged to communicate via a wired communication protocol, e.g., USB or MTP, thus enabling the communication enabled circuit breakers 104-1 to 104-10 to communicate using a wired communication scheme.

The circuit breaker panel 102 further houses a circuit breaker controller 106. The circuit breaker controller 106 may include communication components (refer to FIG. 4). In an alternative embodiment, the circuit breaker controller 106 is coupled to the circuit breaker panel 102 in an external arrangement. For example, the controller 106 could be housed in a different panel than panel 102 or disposed external to the panel 102. The communication components associated with the circuit breaker controller 106 may enable the circuit breaker controller 106 to communicate (e.g., send and/or receive information elements including data, indications of operating conditions, instructions, updated fault interruption instructions, or the like) using any of a variety of communication standards.

In general, the communication enabled circuit breakers 104-1 to 104-10 and the circuit breaker controller 106 (and particularly, the communication components of these devices) can be arranged to communicate using a variety of communication technologies, which may be wireless or wired in nature, for example, the communication enabled circuit breakers 104 and circuit breaker controller 106 can be arranged to wirelessly communicate via ZigBee®, Z-Wave, Bluetooth®, Bluetooth® Low energy (BLE), 6LowPan, Thread, Cellular, Sigfox®, NFC, Neul®, LoRaWAN™, or the like. In some implementations, communication enabled circuit breakers 104-1 to 104-10 and the circuit breaker controller 106 communicate via wired (as opposed to wireless) technologies. For example, the communication enabled circuit breakers 104 may be communicatively coupled via a wired link to the circuit break controller 106.

The circuit breaker controller 106 may be configured to communicate via multiple wireless communication components. For example, circuit breaker controller 106 may be configured to communicate with communication enabled circuit breakers 104-1 to 104-10 via BLE as described above. Additionally, the circuit breaker controller 106 can be configured to communicate (e.g., send and/or receive information elements including data, indications of operating conditions, instructions, updated fault interruption instructions, or the like) via a second wireless communication scheme or via a wired communication scheme. For example, the circuit breaker controller 106 could include wireless communication components arranged to wirelessly communicate via Wi-Fi® technology, thus enabling the wireless circuit breaker controller 106 to communicate using Wi-Fi communication schemes. Accordingly, the circuit breaker controller 106 can communicate with devices external to the circuit breaker panel 102 via wireless channel 108, for example, using Wi-Fi communication schemes. In general, however, the circuit breaker controller 106 may be enabled to communicate with devices external to the circuit breaker panel 102 using any suitable type of communication technology (e.g., BLE, 4G, LTE, Wi-Fi, USB, RS232, MTP, etc.).

Components from the circuit breaker panel 102 may communicate (e.g., wirelessly or wired) with one or more remote entities 120. For example, the communication enabled circuit breakers 104 and/or the circuit breaker controller 106 of panel 102 may communicate wirelessly with a mobile device 110 (e.g., tablet computer, mobile phone, etc.), a computing device 112 (desktop computer, server, etc.) and/or the Internet 114 (e.g., a server device or computing device linked to the Internet). For example, the communication enabled circuit breakers 104-1 to 104-10 can communicate with the circuit breaker controller 106, which can itself, communicate with any one of remote entities 120. It is noted, remote entities 120 are depicted including mobile device 110, computing device 112, and Internet 114. However, remote entities 120 could include just a single device or entity remote to circuit breaker panel 120. The term remote entities 120 is used herein to refer to one or more devices remote to the panel 120, such as, for example, mobile device 110, computing device 112, and Internet 114. Furthermore, although the term remote entity 120 is sometimes used herein in the plural, it is not intended to imply or denote multiple devices or multiple entities remote to panel 102 but could simply refer to a single entity remote to the system (e.g., just the Internet 114, just the mobile device 110, or the like).

In some examples, the communication enabled circuit breakers 104-1 to 104-10 can directly couple to remote entities 120. For example, the mobile device 110 can communicate directly (e.g., via BLE) with at least one of the communication enabled circuit breakers 104-1 to 104-10. In addition, the circuit breaker panel 102 may include wireline connectivity functionality, such as an Ethernet port, to enable wireline communication with one or more remote entities. In some implementations, the communication enabled circuit breakers 104-1 to 104-10 may establish a mesh network. For example, communication enabled circuit breaker 104-1 may share a wireless connection with a remote entity 120 with wireless circuit breaker 104-2. Furthermore, in such a mesh network topology, communication enabled circuit breaker 104-2 may share the wireless connection to the remote entity 120 with communication enabled circuit breaker 104-3 and communication enabled circuit breaker 104-4. Therefore, using the mesh network topology, the wireless connection to the remote entity 120 may be shared between the communication enabled circuit breakers 104-1 to 104-10. The mesh network may be implemented in accordance with wireless communication schemes, or standards, such as, BLE standards, Wi-Fi standards, or the like.

The circuit breaker controller 106 may communicate, or exchange signals including indications of data, operating conditions, fault detection events, fault interruption instructions, or the like with one or more of the communication enabled circuit breakers 104 and/or devices remote to the circuit breaker panel 102. For example, the circuit breaker controller 106 may be configured to transmit updated software (e.g., operating software, firmware, fault interrupter instructions, etc.) to one or more of the communication enabled circuit breakers 104. The circuit breaker controller 106 may provide, e.g., updated firmware to one or more of the communication enabled circuit breakers 104. Furthermore, the circuit breaker controller 106 may provide updated fault interrupter instructions to one or more of the communication enabled circuit breakers 104. The updated fault interrupter instructions may replace fault interrupter instructions stored in one or more of the communication enabled circuit breakers 104. The updated fault interrupter instructions may be received at the circuit breaker controller 106 from one or more remote entities, such as the mobile device 110, the computing device 112 and/or the Internet cloud 114. The circuit breaker controller 106 may wirelessly communicate fault interrupter instructions to one or more of the communication enabled circuit breakers 104 using communication technology, such as BLE. Alternatively, one or more remote entities, such as the mobile device 110, the computing device 112 and/or the Internet cloud 114, may directly provide updated fault interrupter instructions to one or more of the communication enabled circuit breakers 104. To that end, the one or more remote entities may communicate fault interrupter instructions to one or more of the communication enabled circuit breakers 104 using wireless communication technology, such as BLE.

In general, fault interrupter instructions stored in the communication enabled circuit breaker 104 and/or updated fault interrupter instructions may include parameters of operating conditions intended to trigger a trip event. Said differently, the fault interrupter instructions and/or updated fault interrupter instructions can be configured to control fault condition detection algorithms and/or fault interruption characteristics of the communication enabled circuit breakers 104. For example, the fault interrupter instructions stored in the communication enabled circuit breaker 104 and/or updated fault interrupter instructions may define an overcurrent trip value in amps and an overcurrent trip response time in seconds. In addition, the fault interrupter instructions stored in the communication enabled circuit breaker 104 and/or updated fault interrupter instructions may define parameters associated with the communication enabled circuit breaker 104. Such parameters may include current rating, voltage rating, time current curve characteristics (e.g., the relationship between the sensed overcurrent and the time required under which to trip the communication enabled circuit breaker 104), status, trip alarm, remote trip, single phase or three phase, and the like.

In a particular implementation, the fault interrupter instructions stored in the communication enabled circuit breaker 104 and/or updated fault interrupter instructions may also include power metering instructions. The power metering instructions may enable the communication enabled circuit breaker 104 to measure and/or calculate line voltage/current, line frequency, phase current and/or voltage associated with a multiple phase system, and/or power consumption. In a particular implementation, the power metering instructions enable the communication enabled circuit breaker 104 to obtain metering information associated with a branch circuit coupled to the communication enabled circuit breaker 104. The obtained metering information may include current, voltage, root mean square (RMS) current, RMS voltage, power, reactive power, active power, reactive energy, active energy, etc. The obtained metering information may be conveyed to the circuit breaker controller 106 by way of the communication enabled circuit breaker 104.

The circuit breaker controller 106 may relay the obtained metering information to an external entity, such as the mobile device 110, the computing device 112 and/or the Internet cloud 114. The circuit breaker controller 106, external entity, such as the mobile device 110, the computing device 112 and/or the Internet cloud 114, and/or the communication enabled circuit breaker 104 may obtain the metering information using one or more calculations that use voltage and current samples obtain from the line side power connection(s) (refer to FIGS. 2A and 3). Furthermore, wireless circuit breaker controller 106, external entity, such as the mobile device 110, the computing device 112 and/or the Internet cloud 114, and/or the communication enabled circuit breaker 104 may store the metering information to establish historical data that relates to the metering information. The historical data that relates to the metering information may be used in making a determination to: (1) update fault interrupter instructions associated with one or more communication enabled circuit breaker 104, (2) calibrate one or more communication enabled circuit breaker 104, (3) predict faults on branch circuits, (4) predict failure of loads coupled to branch circuits, etc.

In some embodiments, the circuit breaker controller 106 includes a power supply that is coupled to a line side phase connection. Likewise, each of the communication enabled circuit breakers 104 includes a power supply that is coupled to a line side phase connection. The power supply may be a AC to DC converter, an AC to AC converter, or the like. In general, the power supply is provided to condition and/or convert a voltage of the line side phase connection to one or more voltages that are supplied to components of the circuit breaker controller 106 and/or each of the communication enabled circuit breakers 104. Furthermore, the power supply may include one or more fuses to protect components of the circuit breaker controller 106 and/or each of the communication enabled circuit breakers 104. Advantageously, the circuit breaker controller 106 and/or each of the communication enabled circuit breakers 104 are supplied with power even in the event of a load side incident that causes one or more of the communication enabled circuit breakers 104 to trip.

In some embodiments, one or more of the communication enabled circuit breakers 104 are configured to automatically transmit fault related information upon occurrence of a trip incident. In particular, one or more of the communication enabled circuit breakers 104 transmits such fault related information to the circuit breaker controller 106. In some embodiments, the fault related information is transmitted using BLE. The fault related information may include, for example, a unique identifier of the communication enabled circuit breaker 104 that tripped (e.g., a unique wireless circuit breaker serial number, or the like), a time and date of the trip incident, a load signature that caused the trip incident, a zone or area that is without power as a result of the trip incident, metering information etc. In addition, the fault related information may include current, voltage noise, differential current and voltage, and/or other monitored parameters observed before the trip incident. Furthermore, the fault related information may include a firmware version of the communication enabled circuit breaker 104. The circuit breaker controller 106 may disseminate the fault related information to one or more devices external of the circuit breaker panel 102. For example, the circuit breaker controller 106 may transmit the fault related information to the mobile device 110, the computing device 112 and/or the Internet cloud 114. Therefore, a user or users of the mobile device 110, the computing device 112 and/or the Internet cloud 114 may be made immediately aware of the trip incident by way of at least the wirelessly transmitted fault related information.

In another embodiment, one or more of the communication enabled circuit breakers 104 are configured to transmit status related information upon request by the circuit breaker controller 106. The request by the circuit breaker controller 106 may be wirelessly communicated to one or more of the communication enabled circuit breakers 104 using BLE. The status related information may include self-test related information provided by one or more of the communication enabled circuit breakers 104. In some implementations, the self-test related information may include operational status of components associated with one or more of the communication enabled circuit breakers 104.

As discussed above, one or more remote entities, such as the mobile device 110 and/or the computing device 112 and/or the Internet cloud 114 may directly communicate with one or more of the communication enabled circuit breakers 104. For example, the mobile device 110 may provide updated fault interrupter instructions to one or more of the communication enabled circuit breakers 104. In such an embodiment, the one or more remote entities may wirelessly communicate (e.g., via BLE) updated fault interrupter instructions directly to one or more of the communication enabled circuit breakers 104 without communicating through the circuit breaker controller 106. Direct communication between the mobile device 110 and the communication enabled circuit breakers 104 enables an electrician (or other suitable user) to interface in real-time with the communication enabled circuit breakers 104 and conduct a number of operations, all from within the same application on the mobile device 110.

For example, the electrician may put a communication enabled circuit breaker 104 in a data acquisition/logging only mode, where when the communication enabled circuit breaker 104 is in the data acquisition only mode, the communication enabled circuit breaker 104 will not trip upon the occurrence of a fault but, rather, would pass the data in real-time to the mobile device 110 for analysis by either the mobile device 110, the electrician, or other suitable entity. For example, in the data acquisition only mode, the communication enabled circuit breaker 104 may be configured to not trip upon the occurrence of an arc fault, a ground fault, an overcurrent fault, or a combination of these. With some examples, while in data acquisition only mode, the communication enabled circuit breaker 104 may be arranged to not trip on an AFCI fault, but still trip on a GFCI faults. In some examples, the communication enabled circuit breaker 104 may be arranged to "time out" of data acquisition only mode and return to normal functioning mode (e.g., after a set amount on time (90 seconds, 120 seconds, 240 seconds, etc.) In other words, with some examples, in the data acquisition only mode the communication enabled circuit breaker 104 may be configured to trip upon detection of an overcurrent but not trip upon detection of an arc fault. In addition to the electrician, remote users may also communicate with the communication enabled circuit breaker 104 and/or the electrician via the same application on different devices.

Additionally, the electrician can then iteratively make adjustments to the fault interrupter instructions and transmit updated fault interrupter instructions to the communication enabled circuit breaker 104 and analyze the resulting data from the communication enabled circuit breaker 104. In this manner, the fault interrupter instructions can be refined/tailored to avoid unintentional fault interrupts (e.g. nuisance tripping) of the communication enabled circuit breaker 104. This refinement of the fault interrupter instructions may be done for any particular communication enabled circuit breaker 104 as required, a plurality of communication enabled circuit breakers 104, or every communication enabled circuit breaker 104 in the circuit breaker panel 102. Likewise, the refinement of the fault interrupter instructions may be implemented across multiple installations or be implemented globally to all suitable breakers and in many or all installations. While the communication enabled circuit breaker 104 is in the data acquisition only mode, the communication enabled circuit breaker 104 may indicate, by any number of methods, when it would otherwise trip. Examples of such indication include flashing of LED(s) or transmitting the indication to the mobile device 110.

As noted, communication enabled circuit breakers 104 and circuit breaker controller 106 can be arranged to communicate via wireless or wired technologies. However, for clarity of presentation, the following examples depict and describe communication enabled circuit breakers 104 and a circuit breaker controller 106 arranged to communicate via wireless communication protocols. As such, many of the communication enabled circuit breakers 104 described in the following examples are referred to as "wireless circuit breakers" 104 or "communicating circuit breaker" 104. Likewise, the circuit breaker controller 106 may be referred to as a "wireless circuit breaker controller" 106. This is not intended to be limiting and the example breakers, controller, remote entities, techniques, and systems depicted and described below can be implemented with wired communication technologies without departing from scope of the disclosure. Additionally, the wireless circuit breakers 104 and the wireless circuit breaker controller 106 are described herein to communicate via BLE for purposes of convenience and clarity of presentation. This is also not intended to be limiting.

Figure 2A:
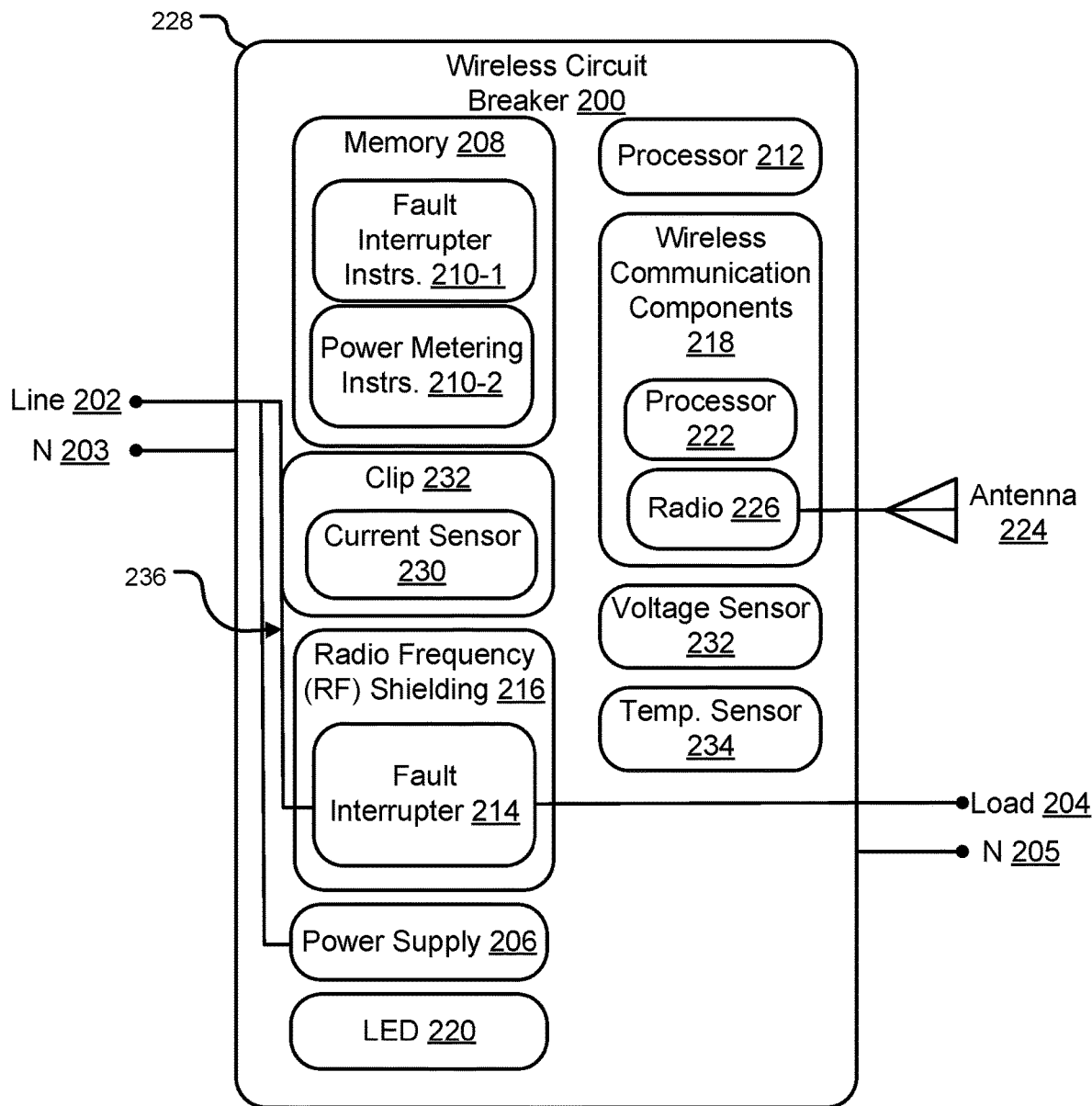
FIG. 2A illustrates a first exemplary embodiment of a communication enabled circuit breaker.

FIG. 2A illustrates the wireless circuit breaker 200 in accordance with an exemplary embodiment. In some examples, the wireless circuit breaker 200 can be implemented as any one of the communication enabled circuit breakers 104-1 to 104-10 of the system 100 of FIG. 1. Generally, the wireless circuit breaker 200 may be used in a wide range of commercial, residential, and industrial circuit breaker panels. The wireless circuit breaker 200 may be configured to operate in conjunction with different electrical power distribution systems, including single-phase, split-phase, 3-phase delta, and 3-phase star. These systems may operate at any suitable voltage such as 120/240 (120V phase-neutral, 240 phase-to-phase), 120/208, 265/460, 277/480.

The wireless circuit breaker 200 includes multiple connections or "terminals." Specifically, wireless circuit breaker 200 includes a line side phase connection 202, a line side neutral connection 203, a load side phase connection 204, and a load side neutral connection 205. The line side phase connection 202 and line side neutral connection 203 are coupled to a power source. The load side power phase connection 204 and load side neutral connection 205 are coupled to a load. Thus, current can enter the wireless circuit breaker 200 via the line side phase connection 202, exit the wireless circuit breaker 200 via the load side phase connection 204, return to the wireless circuit breaker 200 via load side neutral connection 205, and travel back to the power source via line side neutral connection 203. The line side phase connection 202 and neutral connection 203 may be coupled to a power source (e.g. an electrical grid). The load side phase connection 204 and the load side neutral connection 205 may be coupled to a load (e.g., HVAC system, refrigerator, TV, etc.).

The wireless circuit breaker 200 may include a power supply 206. The power supply 206 receives an input power from the line side phase connection 202 and the line side neutral connection 203. The power supply 206 converts, in some implementations, an AC voltage to a regulated DC voltage for use by some or all of the electrical components associated with the wireless circuit breaker 200. To that end, the voltage provided by the power supply 206 is uninterrupted even when the wireless circuit breaker 200 is caused to trip as a result of a trip incident. In some examples, the power supply 206 includes circuitry to condition the current and/or voltage supplied to the electrical components of the wireless circuit breaker 200. In some examples, power supply 206 includes a fuse, which can in some embodiments be replaceable, to protect the power supply 206 and wireless circuit breaker 200 from overcurrent conditions. In some examples, the power supply 206 itself includes a circuit breaker to protect the power supply 206 and wireless circuit breaker 200 from overcurrent conditions. In some examples, power supply 206 itself includes a circuit breaker to protect the power supply 206 and wireless circuit breaker 200 from overcurrent conditions.

A memory 208 is disposed in the wireless circuit breaker 200. The memory 208 may comprise an article of manufacture. In some examples, the memory 208 may include any non-transitory computer readable medium or machine readable medium, such as an optical, magnetic or semiconductor storage. The memory 208 may store various types of computer executable instructions 210. The memory 208 may be coupled to a processor 212. The processor 212 could be any of a variety of processors, such as, for example, a central processing unit, a microprocessor, a field programmable gate array, an application specific integrated circuit, or the like. The processor 212 can be arranged to execute instructions 210 to aid in performing one or more techniques described herein.

In some implementations, the memory 208 is configured store fault interrupter instructions 210-1. The processor 212 can be arranged to execute fault interrupter instructions 210-1 to aid in performing one or more techniques described herein (e.g., cause the wireless circuit breaker 200 to trip, cause the wireless circuit breaker 200 to wirelessly transmit information pertaining to a trip incident, etc.). Additionally, the memory 208 is configured store power metering instructions 210-2. The processor 212 can be arranged execute power metering instructions 210-2 to aid in performing one or more techniques described herein (e.g., cause the wireless circuit breaker 200 to collect current and voltage signals on the line side phase connection 202, cause the wireless circuit breaker 200 to obtain or calculate metering information based on current and voltage, etc.).

In some examples, the wireless circuit breaker 200 could be provisioned with more than one set of fault interrupter instructions 210-1. For example, memory 208 could store different sets (or types) of fault interrupter instructions 210-1 while processor 212 could be arranged to execute a selected one of the sets of fault interrupter instructions 210-1 depending upon certain condition(s), e.g., whether the building in which the panel is coupled is occupied, whether the building in which the panel is coupled is under constructions, a time of day, a time of year, a geographic location of the panel, or the like.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context. The memory 208 may be one or more memory chips capable of storing data and allowing any storage location to be directly accessed by the processor 212, such as any type or variant of Static random access memory (SRAM), Dynamic random access memory (DRAM), electrically erasable programmable read-only memory (EEPROM), Ferroelectric RAM (FRAM), NAND Flash, NOR Flash and Solid State Drives (SSD).

The wireless circuit breaker 200 includes a fault interrupter 214 or "circuit interrupter" 214. In general, the line side phase connections and the load side phase connections are electrically coupled via a conductive path, which can be selectively electrically opened or closed based on circuit interrupter 214. In some implementations, the fault interrupter 214 is operable to interrupt faults (e.g., decouple the load side phase connection 204 from the line side phase connection 202) based in part on the fault interrupter instructions 210 stored in the memory 208. As used herein, the term "fault" could include any of a variety of conditions with which it may be desirable for the wireless circuit breaker 200 to disconnect the line side connection from the load side connection. For example, "fault" may a fault within the breaker, a fault on the load side, a fault on the line side, or the like. As another example, "fault" may be a ground fault, an arc fault, an overcurrent fault, or the like. Examples are not limited in these contexts.

The fault interrupter 214 may comprise various hardware elements. In some examples, the fault interrupter 214 includes at least a trip solenoid and/or an energy storage element to trip the trip solenoid. The fault interrupter instructions 210 may be executed (e.g., by fault interrupter 214, by processor 212, or the like) to cause the trip solenoid to break current flowing from the line side phase connection 202 to the load side phase connection 204 in specific conditions. For example, when the current exceeds a threshold defined by the fault interrupter instructions 210. In another example, the fault interrupter 214 includes functionality, controllable by way of the fault interrupter instructions 210, to sense characteristics of a line current, for example an amount of current, a frequency of the current, high-frequency current components, dynamic distribution of the frequency components over time and within a half cycle of a power line frequency, various profiles of power line characteristics, etc.

The fault interrupter 214 may be sensitive to radio frequency (RF) signals (i.e., wireless signals). Therefore, the fault interrupter 214 may be partially or completely surrounded by an RF shielding 216. The RF shielding 216 may comprise any suitable material such as ferrous material, to attenuate wireless signals. In some implementations, the RF shielding 216 shields the fault interrupter 214 from wireless signals generated by the: wireless circuit breaker 200, other wireless circuit breakers 200, wireless circuit breaker controller 106, and/or entities external of the circuit breaker panel 102.

The wireless circuit breaker 200 includes wireless communication components 218. The wireless communication components 218 enables the wireless circuit breaker 200 to communicate wirelessly using any suitable type of wireless communication technology as described herein. Therefore, the wireless communication components 218 may include at least a radio 226, an antenna 224, and processor 222. In general, the radio 226 can be any radio configured to communicate using a wireless transmission scheme, such as, for example, BLE. The antenna 224 can be coupled to the radio 226 and configured to emit and receive RF signals. For example, the antenna 224 can emit RF signals received from the radio 226 (or radio transceiver circuitry, which is not depicted for clarity) coupled between the radio 226 and the antenna 224. The antenna 224 could be any of a variety of antennas (or antenna arrays) having different shapes and/or configurations arranged to emit/receive RF signals on a particular frequency, range of frequencies, or the like. Furthermore, the antenna 224 could be internal to the housing 228 of the wireless circuit breaker 200 or external to the housing 228 or packing of the breaker 200. The processor 222 can be any of a variety of processors (e.g., application processor, baseband processors, etc.) arranged to perform at least transmission and reception of wireless signals associated with the wireless circuit breaker 200.

As described, the wireless communication components 218 receives power from the power supply 206, which is coupled to the line side phase connection. Therefore, the wireless communication components 218 enable the wireless circuit breaker 200 to communicate wirelessly even in the event that the fault interrupter 214 interrupts current flowing between the line side phase connection 202 and the load side phase connection 204.

A light emitting diode (LED) 220 may be implemented on the wireless circuit breaker 200. The LED 220 may be illuminated to a predefined color when the wireless circuit breaker 200 is in an update mode. The update mode indicates that the wireless circuit breaker 200 is ready to receive updated fault interrupter instructions for storage in the memory 208. In some implementations, when the wireless circuit breaker 200 is an update mode, the wireless circuit breaker 200 is open or tripped. In some implementations, when the wireless circuit breaker 200 is an update mode, the wireless circuit breaker 200 is unable to provide tripping functionality. This is described in greater detail below.

Figure 7:
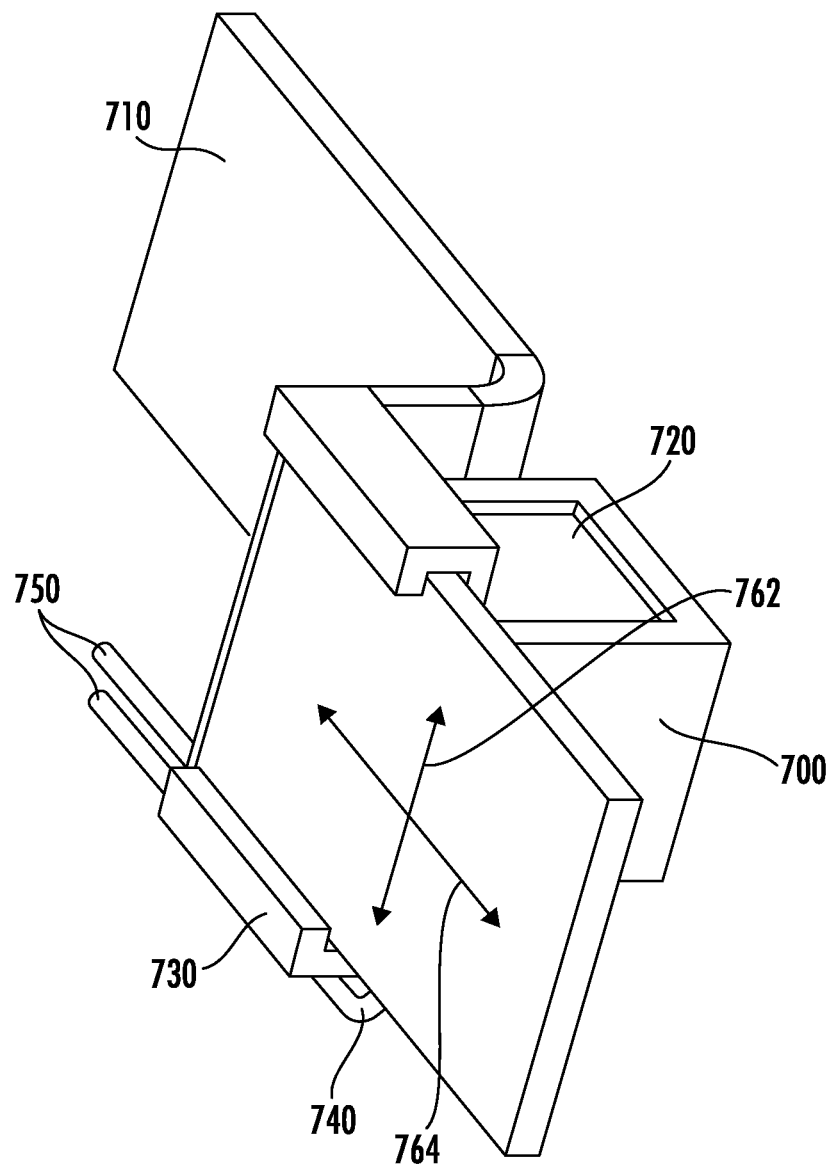
FIG. 7 illustrates a first view of a sensor housing according to an exemplary embodiment.

The wireless circuit breaker 200 may comprise the housing 228. An exemplary circuit breaker housing is illustrated in FIG. 7.

In some implementations, the wireless circuit breaker 200 includes a current sensor 230. The current sensor 230 may be a transformer based current sensor, Hall effect current sensor, or the like. In a particular implementation, the current sensor 230 is a Rogowski coil current sensor. In general, the current sensor 230 provides a signal that is proportional to a derivative of a current flowing in the line side phase connection 202. Therefore, the current sensor 230 may be arranged proximate to the line side phase connection 202. The signal generated by the current sensor 230 may be provided to the processor 212.

Figure 2B:
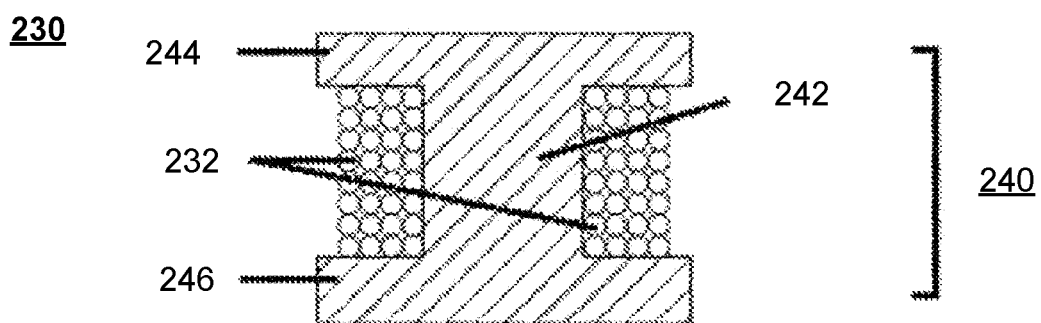
FIG. 2B illustrates an exemplary current sensor according to an embodiment.

In some specific implementations, the current sensor 230 includes a core and a conductive coil. The core can be made of magnetic material and can have flanges attached to the core. For example, the core may have multiple (e.g., two, or the like) square flanges connected to a solid cylindrical member. The core is then placed such that the current path to be measured (e.g., along the conductive path between line and load terminals 202 and 204, or the like) runs perpendicular to the cylindrical member either at the center of one of the flanges or offset by some distance. For example, FIG. 2B illustrates an example current sensor 230 includes magnetic coils 232 wound around a core 240, sometimes referred to as a magnetic flux concentrator (MFC).

MFC 240 can include a center post 242 and flanges 244 and 246. In general, upper flange 244, lower flange 246, and center post 242 are arranged along the vertical Z-axis. Center post 242 acts as a bobbin around which the sense coil winding 232 is wrapped. In some examples, such as shown in FIG. 2B, the MFC 240 varies in lateral cross-sectional area from a relatively large area at the upper and lower flanges to a relatively smaller cross-sectional area at the center post. Sense coil winding 232 is wound around center post 242 of the MFC 240 between the upper and lower flanges 244 and 246. One advantage of such a configuration is that sense coil winding 232 can be wound over itself, while being physically bound by the upper and lower flanges thereby enabling the use of a smaller sense coil winding with a larger number of turns (as compared with an air coil current sensor) without the use of a separate bobbin component made from, for example, an injection-molded polymer. In referring to cross sectional areas of the flanges 244 and 246 as well as the center post, it is to be understood that these areas are measured parallel to the lateral XY plane which is perpendicular to the Z-axis along which they are arranged. Furthermore, increasing the surface area of the flanges 244 and 246 may result in greater lines of magnetic flux (i.e. magnetic amplification) being transmitted through the cylindrical member 242, and therefore available to measure via sense coil 232.

In a particular implementation, the current sensor 230 is arranged adjacent to the line side phase connection 202. For example, current sensor 230 may be housed in a clip 232 (refer to FIGS. 5-6). The clip 232 may be coupled to the line side phase connection 202. More particularly, the clip 232 can be coupled to a current carrying conductor 236 that electrically connects the line side phase connection 202 to the load side power connection 204, via the fault interrupter 214. With some implementations, the current sensor 230 may have a central axis (e.g., the Z axis depicted in FIG. 2B, or the like) and the clips may couple and retain the current sensor 230 such that the central axis is perpendicular to a longitudinal axis of the current carrying conductor 236.

Although the clip 232 is described in greater detail below, a general description is provided here. In some implementations, the clip 232 has a plastic body. The plastic body may include a shielding applied thereto. In some implementations, the shielding is made from a metallic material, such as a ferrous material. In some examples, the shielding is applied to portions of the plastic body distal from the current carrying conductor 236. In some examples, the shielding is applied to the entirety of the plastic body. In general, the shielding can be configured and/or provided to insulate the current sensor 230 from signals that may be present external to the clip 232. For example, the shielding may attenuate RF signals, current related signals, and the like.

In some implementations, the wireless circuit breaker 200 may also include a voltage sensor 232. The voltage sensor 232 can be coupled to line side phase connection 202 and configured to measure a voltage applied to the line side phase connection 202. The voltage sensor 232 may provide a signal representing a voltage on the line side phase connection 202. The signal representing the voltage on the line side phase connection 202 may be provided to the processor 212.

In some implementations, the wireless circuit breaker 200 may also include a temperature sensor 234. The temperature sensor 234 may be arranged to sense an ambient air temperature proximate to the current sensor 230. Furthermore, the temperature sensor 234 may be arranged to sense a temperature of the ambient air within the housing 228. Furthermore, the temperature sensor 234 may sense a humidity level within the housing 228. The temperature sensor 234 may convert the sensed temperatures and humidity levels to one or more signals that may be provided to the processor 212.

As described, the processor 212 can be arranged execute power metering instructions 210-1 to aid in performing one or more techniques described herein. For example, the processor 212 can cause the wireless circuit breaker 200 to collect signals indicative of current between the line side phase connection 202 and the load side phase connection 204. Additionally, the processor 212 can cause the wireless circuit breaker 200 to collect signals indicative of current and a voltage on the line side phase connection 202. Additionally, the processor 212 can cause the wireless circuit breaker 200 to obtain and/or calculate metering information based on the sensed current, sensed voltage, or both). Those collected current or current and voltage signals may be provided by the current sensor 230 and the voltage sensor 232, respectively. Furthermore, the processor 212 can cause the wireless circuit breaker 200 to condition the obtained or calculated metering information based on temperature and or/humidity signals obtained by the temperature sensor 234. The obtained and/or calculated metering information may include line voltage, mains frequency, line voltage, phase current and/or voltage of a multiphase system, and/or power consumption. Furthermore, obtained and/or calculated metering information may include current, voltage, root mean square (RMS) current, RMS voltage, power, reactive power, active power, reactive energy, active energy, etc. With some examples, processor 212 can determine metering information at a rate of between 4 and 8 kilo Hertz (kHz).

The obtained metering information may be conveyed to the wireless circuit breaker controller 106 by way of the circuit breaker 200. The wireless circuit breaker controller 106 may relay the obtained metering information to an external entity, such as the mobile device 110, the computing device 112 and/or the Internet cloud 114. The wireless circuit breaker controller 106, external entity, such as the mobile device 110, the computing device 112 and/or the Internet cloud 114, and/or the wireless circuit breaker 200 may obtain the metering information using one or more calculations that use current, or voltage and current samples obtain from the line side phase connection 202. Furthermore, the wireless circuit breaker controller 106, external entity, such as the mobile device 110, the computing device 112 and/or the Internet cloud 114, and/or the wireless circuit breaker 200 may store the metering information to establish historical data that relates to the metering information. The historical data that relates to the metering information may be used in making a determination to: (1) update fault interrupter instructions associated with one or more wireless circuit breaker 200, (2) calibrate one or more wireless circuit breaker 200, (3) predict faults on branch circuits, (4) predict failure of loads coupled to branch circuits, etc.

The wireless circuit breaker 200 may comprise the housing. The housing may be a miniature circuit breaker (MCB) housing. In some implementations, the MCB housing has a width of 1 inch. It is noted that the dimensions of the breakers are given for example only. Breaker widths could be any width, e.g., ½ inch, ¾ inch, 1 inch, 1½ inches, 2 inch, or the like.

Figure 3:
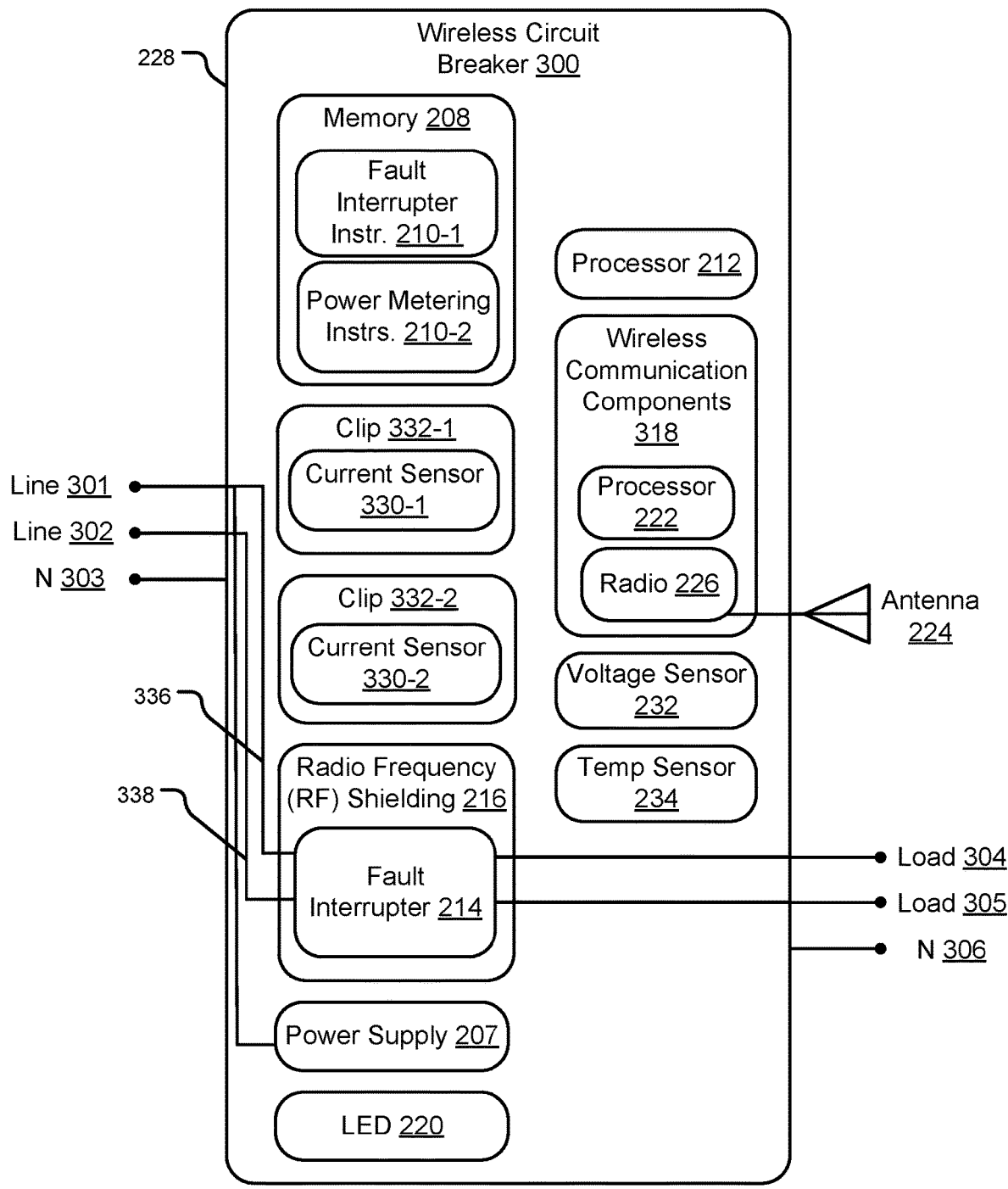
FIG. 3 illustrates a second exemplary embodiment of a communication enabled circuit breaker.

FIG. 3 illustrates a wireless circuit breaker 300 in accordance with another exemplary embodiment. In some examples, the wireless circuit breaker 300 can be implemented as any one of the communication enabled circuit breakers 104-1 to 104-10 of the system 100 of FIG. 1. Generally, the wireless circuit breaker 300 may be used in a wide range of commercial, residential, and industrial circuit breaker panels. The wireless circuit breaker 300 may be configured to operate in conjunction with different electrical power distribution systems, including single-phase, split-phase, 3-phase delta, and 3-phase star. These systems may operate at any suitable voltage such as 120/240 (120V phase-neutral, 240 phase-to-phase), 120/208, 265/460, 277/480. It is noted, wireless circuit breaker 300 includes several similar components to wireless circuit breaker 200, such as memory 208 including fault interrupter instructions 210-1 and power metering instructions 210-2; processor 212, power supply 207, LED 220; and wireless communications components 218 including processor 222 antenna 224 and radio 226. Such similar components are numbered consistently between FIGS. 2A and 3. Furthermore, a description of such components is not repeated when describing breaker 300 for purposes of brevity.

The wireless circuit breaker 300 includes line side phase connections 301 and 302, a line side neutral connection 303, load side phase connections 304 and 305, and a load side neutral connection 306. The line side phase connections 301 and 302 and the line side neutral connection 303 are coupled to a power source. The load side phase connections 304 and 305 and the load side neutral connection 306 are coupled to a load. Thus, current can enter the wireless circuit breaker 300 via the line side phase connections 301 and 302, exit the wireless circuit breaker 300 via the load side phase connections 304 and 305, and return to the wireless circuit breaker 300 via the load side neutral connection 306, and travel back to the power source via the line side neutral connection 303. The line side phase connections 301 and 302 and the line side neutral connection 303 may be coupled to a power source (e.g., an electrical grid). The load side phase connections 304 and 305 and the load side neutral connection 306 may be coupled to a load (e.g., HVAC system, refrigerator, TV, etc.).

The power supply 207 receives an input power from one or more of line side phase connections 301 and 302 and the line side neutral connection 303. The power supply 207 converts, in some implementations, an AC voltage to a regulated DC voltage for use by some or all the electrical components associated with the wireless circuit breaker 300.

The wireless circuit breaker 300 includes current sensors 330-1 and 330-2. As depicted, current sensor 330-1 is coupled to line side phase connection 301 while current sensor 330-2 is coupled to line side phase connection 302. In general, the current sensors 330-1 and 330-2 provide signals that are proportional to a derivative of a current flowing in the respective line side phase connections 301 and 302. The signals generated by the current sensors 330-1 and 330-2 may be provided to the processor 212.

In some implementations, the current sensors 330-1 and 330-2 may be a transformer based current sensor, Hall effect current sensor, or the like. Furthermore, the current sensors 330-1 and 330-2 need not be the same type of current sensor. In a particular implementation, the current sensors 330-1 and 330-2 are Rogowski coil current sensors and may be like the current sensor 230 depicted in FIG. 2B. In general, the current sensors 330-1 and 330-2 provide signals that are proportional to a derivative of a current flowing in the respective line side phase connections 301 and 302 to which the current sensors are coupled. Therefore, the current sensors 330-1 and 330-2 may be arranged proximate to the respective line side phase connections 301 and 302. The signals generated by the current sensors 330-1 and 330-2 may be provided to the processor 212. In particular implementations, the current sensors 330-1 and 330-2 are arranged adjacent to the respective line side phase connections 301 and 302.

In some examples, the current sensors 330-1 and 330-2 may be housed in clips 332-1 and 330-2, respectively. Examples of such clips are given in FIGS. 5-6. The clips 332-1 and 332-1 may be coupled to respective line side phase connections. For example, the clip 332-1 can be coupled to a current carrying conductor 336 that electrically connects line side phase connection 301 to the load side phase connection 304, via the fault interrupter 214. As another example, clip 332-2 can be coupled to a current carrying conductor 338 that electrically connects line side phase connection 302 to the load side phase connection 305, via the fault interrupter 214.

Although the clips 332-1 and 332-2 are described in greater detail below, a general description is provided here. In some implementations, the clips 332-1 and 332-2 have a plastic body. The plastic body may include a shielding applied thereto. In some implementations, the shielding is made from a metallic material. In some examples, the shielding is applied to portions of the plastic body distal from the current carrying conductor, e.g., 336, 338, etc. In some examples, the shielding is applied to the entirety of the plastic body. In general, the shielding can be configured and/or provided to insulate the current sensor (e.g., 330-1, 330-2, etc.) from signals that may be present external of the clips. For example, the shielding may attenuate RF signals, current related signals, and the like.

As described, the processor 212 can be arranged to execute power metering instructions 210-2 to aid in performing one or more techniques described herein. For example, the processor 212 can cause the wireless circuit breaker 300 to collect current signals indicative of current between the line side phase connections 301 and 302 and the load side phase connections 304, and 305. Additionally, the processor 212 can cause the wireless circuit breaker 300 to collect signals indicative of current and voltage on the line side phase connection 301 and 302. Additionally, the processor 212 can cause the wireless circuit breaker 300 to obtain and/or calculate metering information based on sensed current, sensed voltage, or both sensed current and voltage. Those collected current or current and voltage signals may be provided by the current sensors 330-1 and/or 330-2 and the voltage sensor 232. Furthermore, the processor 212 can cause obtained or calculated metering information to be conditioned based on temperature and or/humidity signals obtained by the temperature sensor 234. The obtained and/or calculated metering information may include line voltage, mains frequency, line voltage, phase current, and/or power consumption. Furthermore, obtained and/or calculated metering information may include current, voltage, root mean square (RMS) current, RMS voltage, power, reactive power, active power, reactive energy, active energy, etc. The obtained metering information may be conveyed to the wireless circuit breaker controller 106 by way of the circuit breaker 300. The wireless circuit breaker controller 106 may relay the obtained metering information to a remote entity 120.

The wireless circuit breaker controller 106, remote entity 120, and/or the wireless circuit breaker 300 may obtain the metering information using one or more calculations that use voltage and current samples obtained from the line side phase connections 301 and 302. Furthermore, the wireless circuit breaker controller 106, remote entity 120, and/or the wireless circuit breaker 300 may store the metering information to establish historical data that relates to the metering information. The historical data and other data may be stored in the database 118. The historical data that relates to the metering information may be used in making a determination to: (1) update fault interrupter instructions associated with one or more wireless circuit breaker 300, (2) calibrate one or more wireless circuit breaker 300, (3) predict faults on branch circuits, (4) predict failure of loads coupled to branch circuits, etc.

Figure 4:
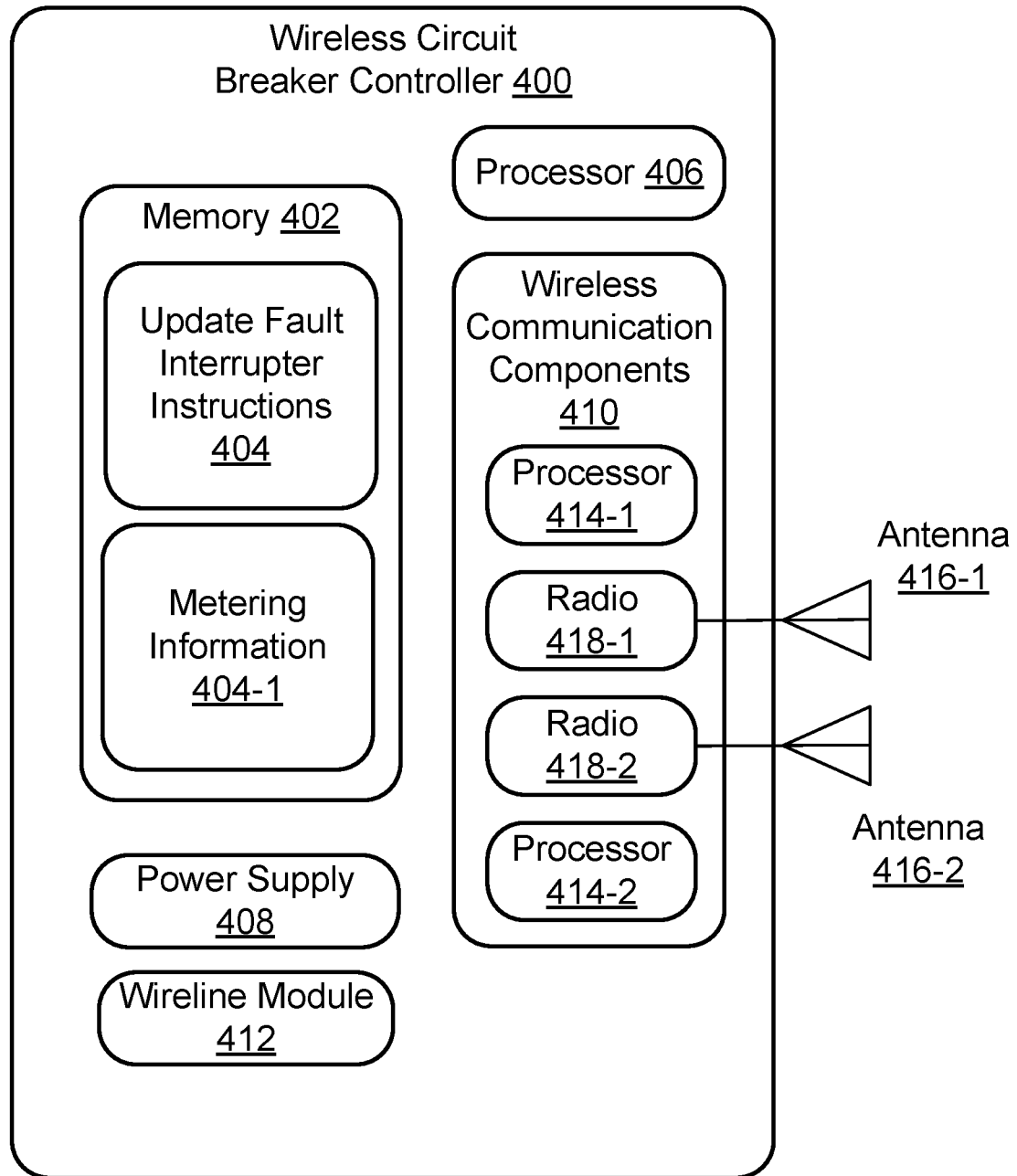
FIG. 4 illustrates a circuit breaker controller in accordance with an exemplary embodiment.

FIG. 4 illustrates the wireless circuit breaker controller 400 in accordance with an exemplary embodiment. In some examples, the wireless circuit breaker controller 400 can be implemented as the circuit breaker controller 106 of the system 100 of FIG. 1. Generally, the wireless circuit breaker controller 400 may be used a wide range of commercial, residential, and industrial power panels. In some embodiments, the wireless circuit breaker controller 400 is implemented in the circuit breaker panel 102. In an alternative embodiment, the wireless circuit breaker controller 400 is coupled to the circuit breaker panel 102 in an external arrangement. For example, in an alternative implementation of the wireless circuit breaker controller 400, the wireless circuit breaker controller 400 is part of a mobile device, such as a mobile phone, having hardware/software functionality to enable the mobile device to function as the described wireless circuit breaker controller 400.

A memory 402 is disposed in the wireless circuit breaker controller 400. The memory 402 is configured to store updated fault interrupter instructions 404. Furthermore, the memory 402 may be configured to store metering information 404-1 received from one or more wireless circuit breakers 104. The stored metering information 404-1 may form the basis of historical information or data associated with individual wireless circuit breakers 104. The memory 402 may comprise an article of manufacture. In some examples, the memory 402 may include any non-transitory computer readable medium or machine readable medium, such as an optical, magnetic or semiconductor storage. The memory 402 may store various types of computable executable instructions, such as the updated fault interrupter instructions 402.

The memory 402 may be coupled to a processor 406. Processor 406 could be any of a variety of processors, such as, for example, a central processing unit, a microprocessor, a field programmable gate array, an application specific integrated circuit, or the like. Processor 406 can be arranged to execute instructions stored in the memory 402 to aid in performing one or more techniques described herein (e.g., cause the updated fault interrupter instructions 404 to be sent to one or more of the wireless circuit breakers 104, cause metering information 404-1 to be sent to external entities, receive fault information including unique identifiers associated with wireless circuit breakers 104 and a time and date of a trip incident that caused fault interrupters 214/314 to interrupt the current flow between line side phase connections 202/300/301 and load side phase connections 204/303/304, etc.).

The wireless circuit breaker controller 400 may include a power supply 408. The power supply 408 is to convert, in some implementations, an AC voltage to a regulated DC voltage for use by some or all of the electrical components associated with the wireless circuit breaker controller 400. With some examples, power supply 408 can include multiple "hot" terminals and a neutral terminal. Thus, power supply 408 could receive power from either "hot" wire to provide redundancy. In the case of multi-phase systems, the power supply 408 could be arranged to couple to multiple phases to provide redundancy for the loss of one of phases.

The wireless circuit breaker controller 400 includes wireless communication components 410. The wireless communication components 410 enable the wireless circuit breaker controller 400 to communicate wirelessly using any suitable type of wireless communication technology (e.g., a short-range wireless/near field wireless technology, Bluetooth®, Wi-Fi®, ZigBee®, etc. Therefore, the wireless communication components 410 may include at least radio 418-1, antenna 416-1, and processor 414-1. In general, the radio 418-1 can be any radio configured to communicate using a wireless transmission scheme, such as, for example, BLE. The antenna 416-1 can be coupled to radio 418-1 and configured to emit and receive RF signals. For example, the antenna 416-1 can emit RF signals received from the radio 418-1 (or a radio front, which is not depicted for clarity) coupled between the radio 418-1 and the antenna 416-1. The antenna 416-1 could be any of a variety of antennas (or antenna arrays) having different shapes and/or configurations arranged to emit/receive radio waves on a particular frequency, range of frequencies, or the like. Processor 414-1 can be any of a variety of processors (e.g., application processor, baseband processors, etc.) arranged to perform at least transmission and reception of wireless signals associated with the wireless circuit breaker controller 400. Furthermore, the antenna 416-1 could be internal to the physical housing or packaging of the breaker controller 400 or external to the physical housing or packing of the breaker controller 400.

As detailed, some embodiments provide wireless communication components 310 of wireless circuit breaker controller 400 can be operable communicate over a number of wireless frequencies or schemes. As such, processor 414-1, radio 418-1 and antenna 416-1 could be arranged to communicate over multiple wireless communication technologies, such as, for example, BLE and Wi-Fi. In other examples, wireless communication components 410 can include multiple sets of processor, radio and antenna. For example, as depicted, components 410 further include radio 418-2, antenna 416-2 and processor 414-2. Thus, the first set of radio 418-1, antenna 416-1 and processor 414-1 can be arranged to communicate using a first wireless communication scheme, such as, BLE while the second set of radio 418-2, antenna 416-2 and processor 414-2 can be arranged to communicate using a second wireless communication scheme, such as, Wi-Fi.

The wireless circuit breaker controller 400 may further include a wireline network interface 412. The wireline network interface 412 enables the wireless circuit breaker controller 400 to be coupled via a wireline connection to various devices. For example, in some implementations, the wireless circuit breaker controller 400 is a standalone device that may be wireline connected (e.g., via Ethernet) to a remote device (e.g., Internet cloud 114) and wirelessly connected to breakers 104 within the circuit breaker panel 102. In such an example, the controller 400 could optionally omit one of the wireless communication components (e.g., wireless communication components 410 arranged to communicate via Wi-Fi, or the like). As another example, the wireless circuit breaker controller 400 could be wireless coupled to wireless circuit breakers (e.g., wireless circuit breaker 200, or the like) via wireless communication components 410 and coupled via a wired communication connection to other communication enabled circuit breakers (not shown) via wireline network interface 412.

Figure 5:
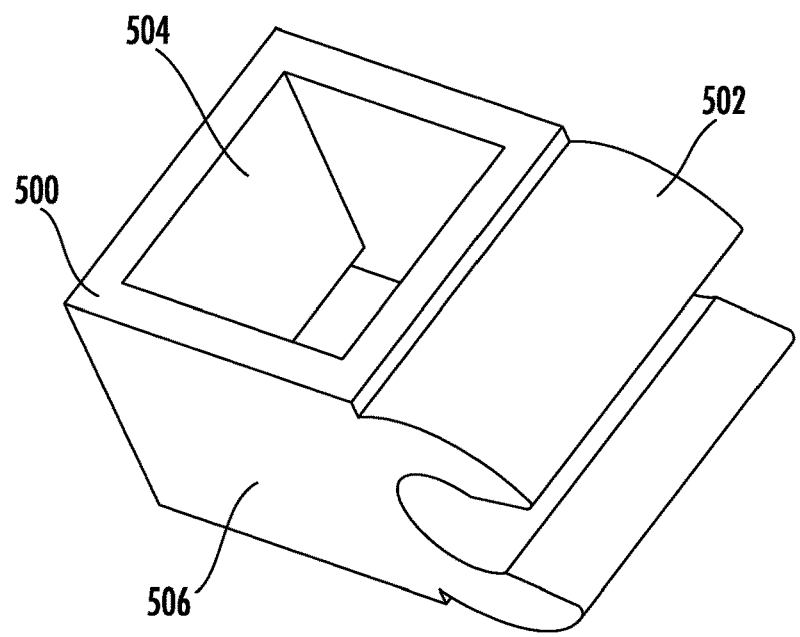
FIG. 5 illustrates a first view of a clip according to an exemplary embodiment.

FIG. 5 illustrates a first view of a clip 500 according to an exemplary embodiment. The clip 500 may house a current sensor, such as the current sensors 230/330-1/330-2 described herein. However, the clip 500 is just an exemplary example of a clip that may be used to house the current sensors 230/330-1/330-2. In some implementations, the clip 500 is to house a Rogowski coil current sensor, such as that depicted in FIG. 2B. The clip 500 may include a c-clamp 502 that may be attached to a line side phase connection, such as the line side phase connection 202/301/302. In particular, c-clamp 502 can be arranged to mechanically couple or clamp onto a current carrying conductor between line side phase connection(s) and a load side phase connection(s), such as conductors 236/336/338. Furthermore, the clip 500 may include an opening 504. A current sensor may be inserted into the opening 504. The clip 500 may be shielded from signals external of the clip 500. For example, a metallic layer 506 may be applied to one or more surfaces of the clip 500. In some implementations, exterior solid surfaces of the clip 500 are coated with a metallic layer. In another implementation, the surfaces associated with the c-clamp 502 do not include a metallic layer.

Figure 6:
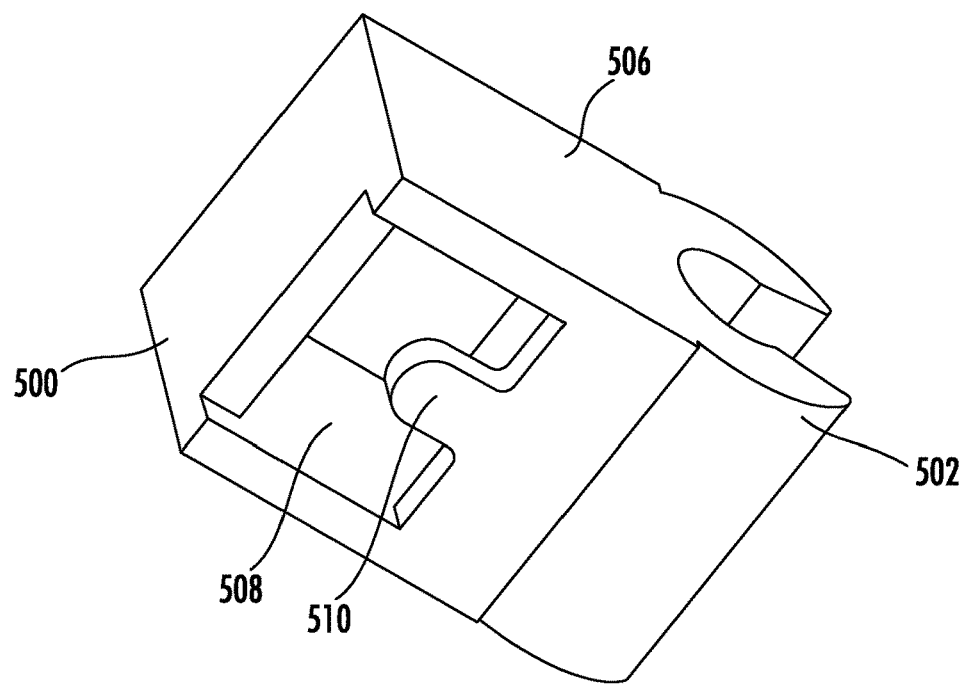
FIG. 6 illustrates a second view of a clip according to an exemplary embodiment.

FIG. 6 illustrates a second view of the clip 500 according to an exemplary embodiment. Opposite the opening 504, a second opening 508 may be defined in the clip 500. The second opening 508 may include a protrusion 510. In some embodiments, the protrusion 510 is a stop for the current sensor when the current sensor is inserted into the clip 500.

FIG. 7 illustrates an example sensor housing 700 coupled to a conductor 710. In general, housing 700 is arranged to house current sensor 720 (e.g., current sensor 230, current sensor 330-1, current sensor 330-2, or the like). Conductor 710 may couple to line (or load) conductors within a breaker (e.g., breaker 104, or the like) in which housing 700 is disposed. Housing 700 includes clips 730 to couple to conductor 710. As depicted, clips 730 may include channels arranged to accept conductor 710 and retain housing 700 about conductor 710, to position current sensor 720 proximate to conductor 710. Housing 700 further includes sensor signal wire clip 740, which can provide routing for signal wires 750 for sensor 720. As depicted, housing 700 may be arranged to provide that a longitudinal axis 762 associated with current sensor 720 is perpendicular to a central axis 764 of conductor 710.

Figure 8:
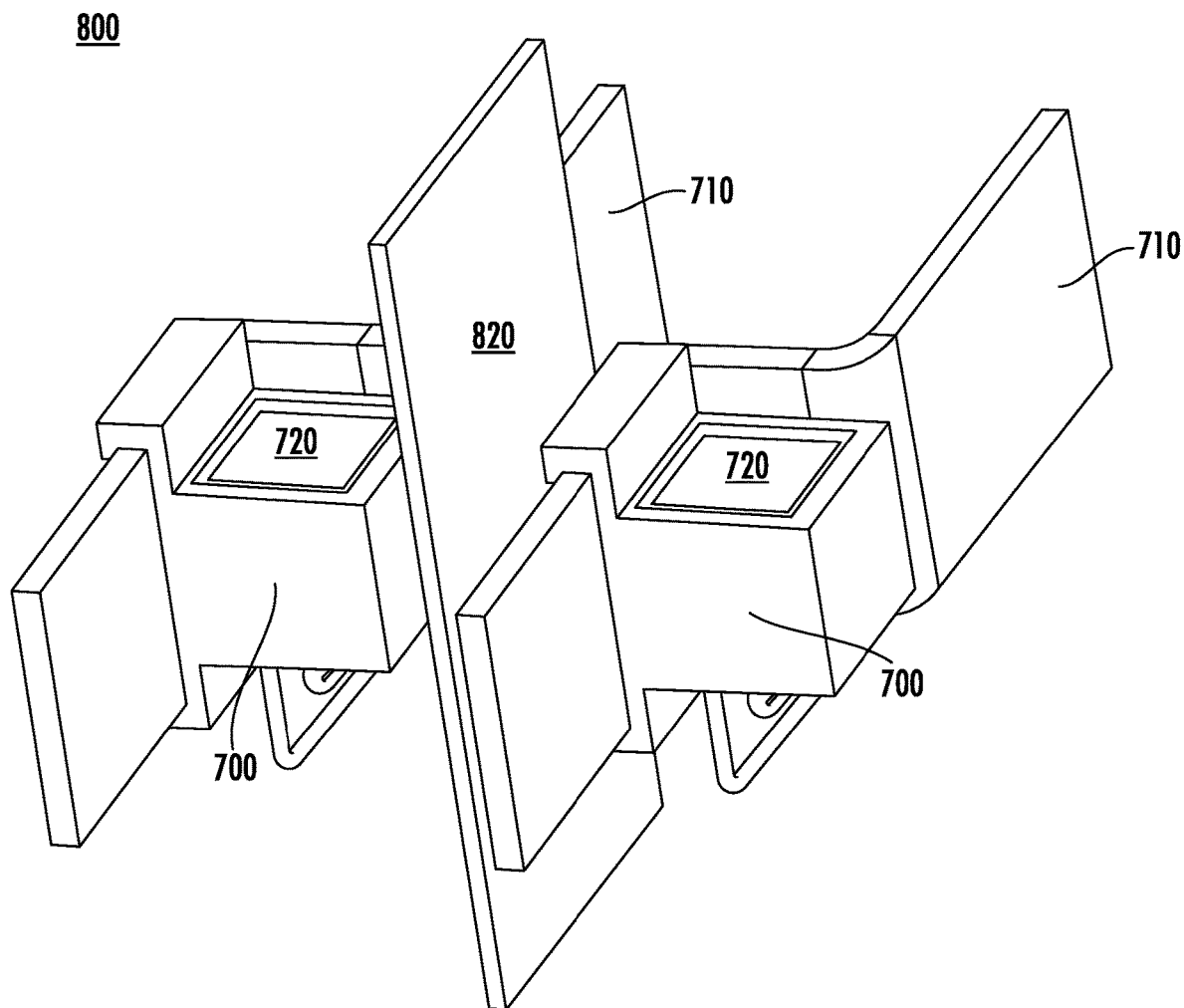
FIG. 8 illustrates a first view of a pair of sensor housings according to an exemplary embodiment.

FIG. 8 depicts system 800 including a pair of sensor housings 700. Each of housings 700 are coupled to a different conductor 810 and arranged to house an individual sensor 720. Furthermore, a shield 820 is disposed between housings 700. In some examples, shield 820 can comprise a ferrite material and be in the range of 0.01 to 0.05 inches thick.

Figure 9:
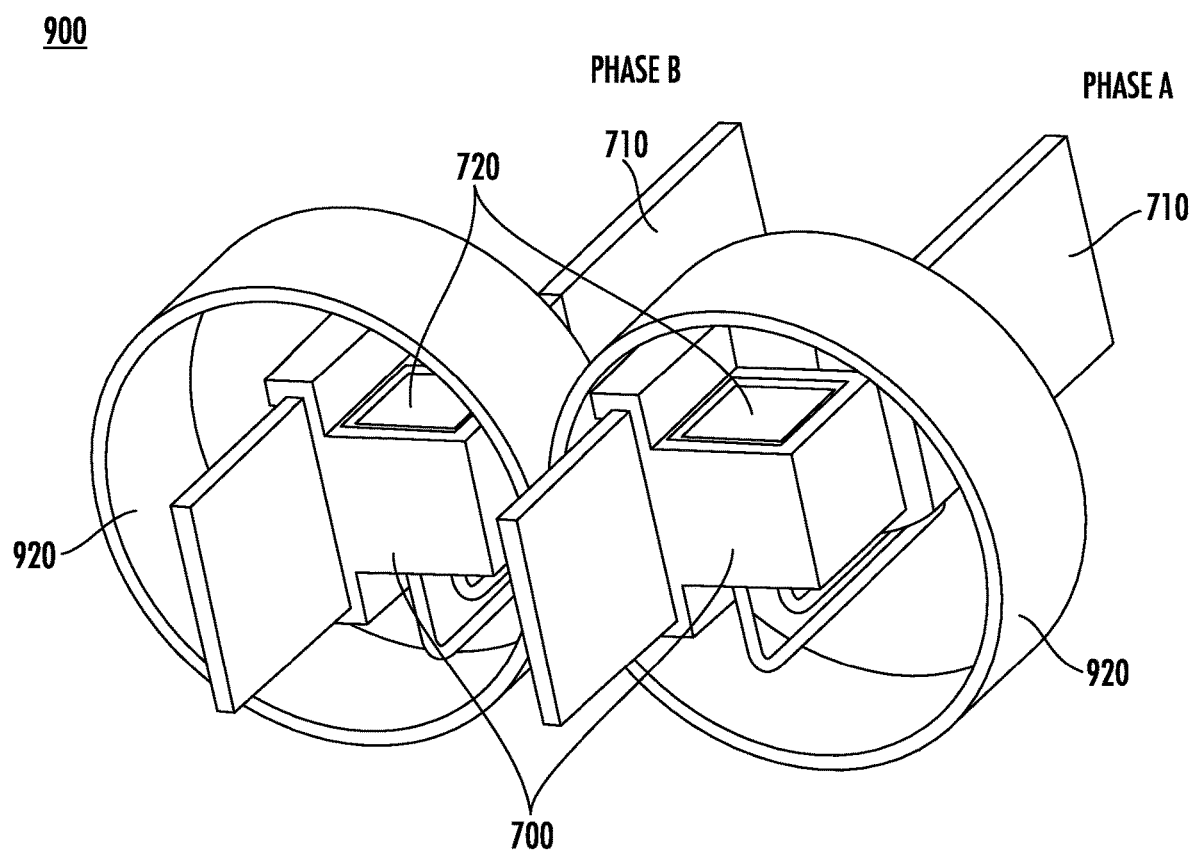
FIG. 9 illustrates a second view of a pair of sensor housings according to an exemplary embodiment.

FIG. 9 depicts system 900 including a pair of sensor housings 700. Each of housings 700 are coupled to a different conductor 910 and arranged to house an individual sensor 720. Each of conductors 720 can correspond to a different phase within a two-phase system (e.g., phase A and phase B, or the like). Furthermore, shields 920 is disposed around housings 700. In some examples, shields 920 can comprise a ferrite material and be in the range of 0.01 to 0.05 inches thick.

Figure 10:
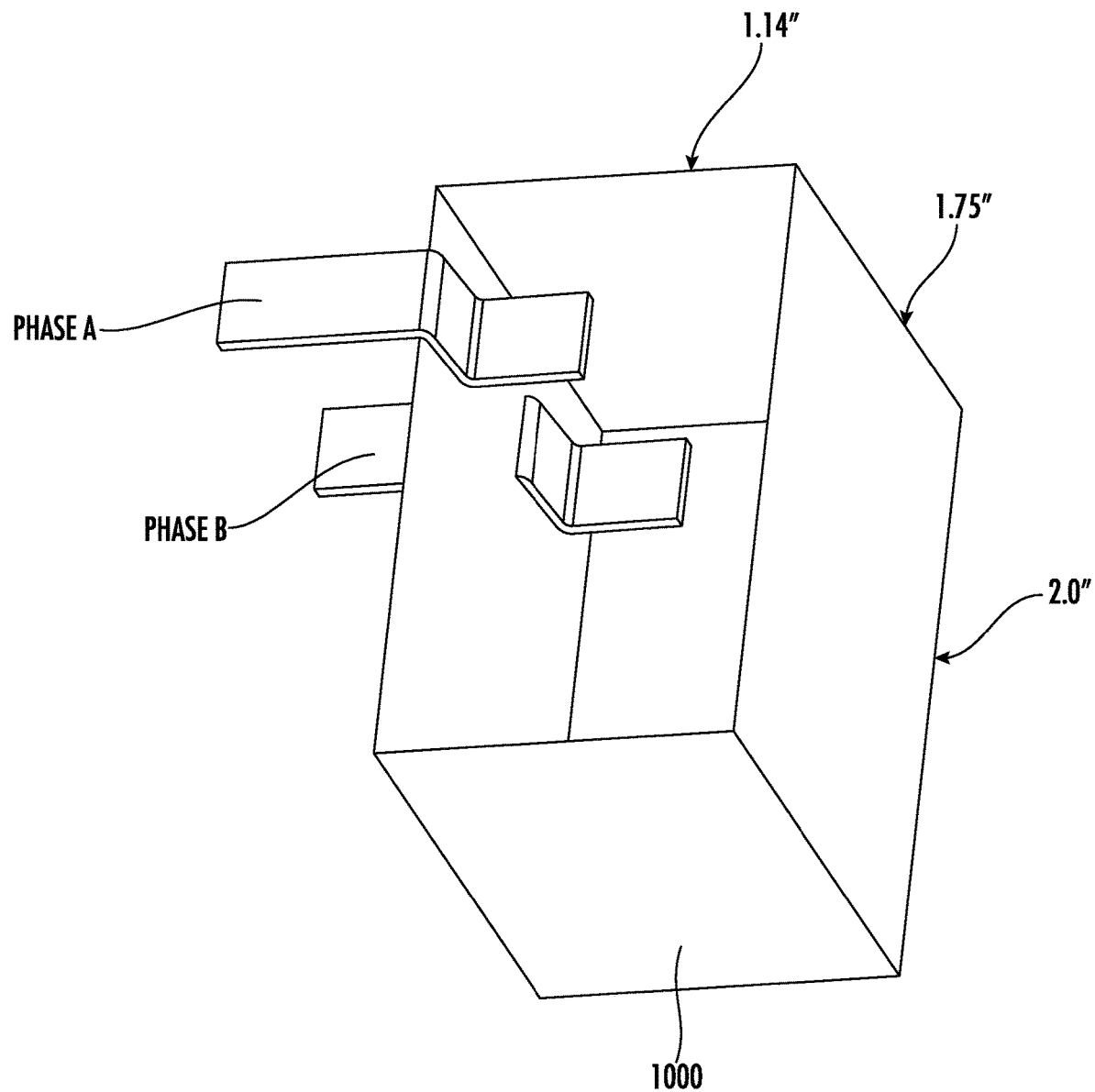
FIG. 10 illustrates a circuit breaker housing according to an exemplary embodiment.

FIG. 10 illustrates a circuit breaker housing 1000 according to an exemplary embodiment. The circuit breaker housing 1000 may be used as the housing 228 and/or the housing 328. Although the circuit breaker housing 1000 is illustrated as a two-phase house housing, the circuit breaker housing 1000 may be altered to include only one phase connection or three or more phase connections. The size of the housing 700 is 2.0"×1.75"×1.14" (length×width×height).

Figure 11:
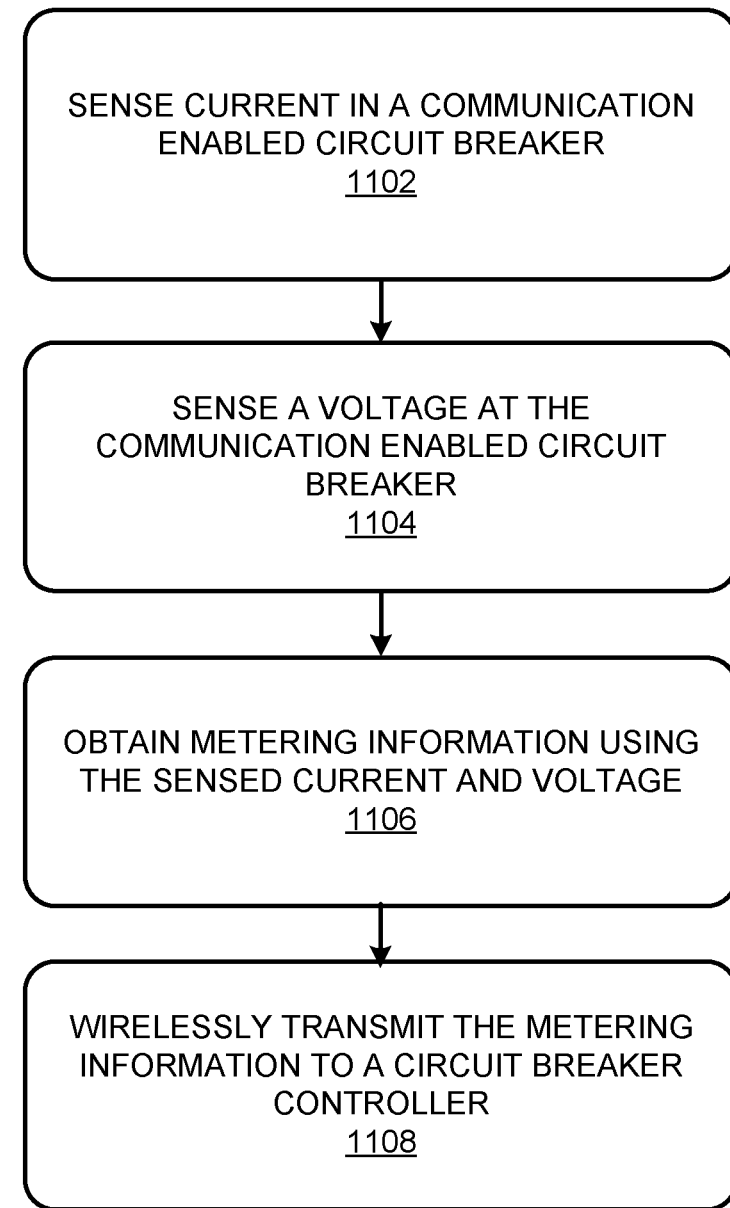
FIG. 11 illustrates a logic flow associated with a communication enabled circuit breaker according to an exemplary embodiment.

FIG. 11 illustrates a logic flow 1100 associated with a wireless circuit breaker (e.g., the communication enabled circuit breaker 104). The logic flow 1100 may begin with block 1102. However, the logic flow 1100 may begin with a different block other than the block 1102. Furthermore, the logic flow 1100 is not illustrated in a particular order. A different order other than that illustrated may be used. Some or all of the communications and operations associated with the logic flow 1100 may be embodied as one or more computer executable instruction. Such computer executable instructions may be stored in the storage medium, such the memory 208/308, or a plurality of disparate storage mediums. A computing device, such as the processor 212/312, may execute the stored computer executable instructions.

At block 1102, the communication enabled circuit breaker senses a current on a first line side phase connection. In addition, in some embodiments, the communication enabled circuit breaker senses a current on a second line side phase connection. The current may be sensed using one or more current sensors. In some embodiments, the one or more current sensors are shielded current sensors such as those described herein. The shielded current sensors may be Rogowski coils.

At block 1104, the communication enabled circuit breaker senses a voltage on a first line side phase connection. In some embodiments, the communication enabled circuit breaker senses a voltage on a second line side phase connection.

At block 1106, the communication enabled circuit breaker obtains metering information using the sensed current and voltage. Obtaining the metering information may include performing calculations using the sense current and voltage. The metering information may include RMS current, RMS voltage, power, reactive power, active power, reactive energy, active energy, line voltage and current, mains frequency, phase current, power consumption, etc.

At block 1108, the metering information is wirelessly transmitted to a circuit breaker controller (e.g., the circuit breaker controller 106).

Figure 12:
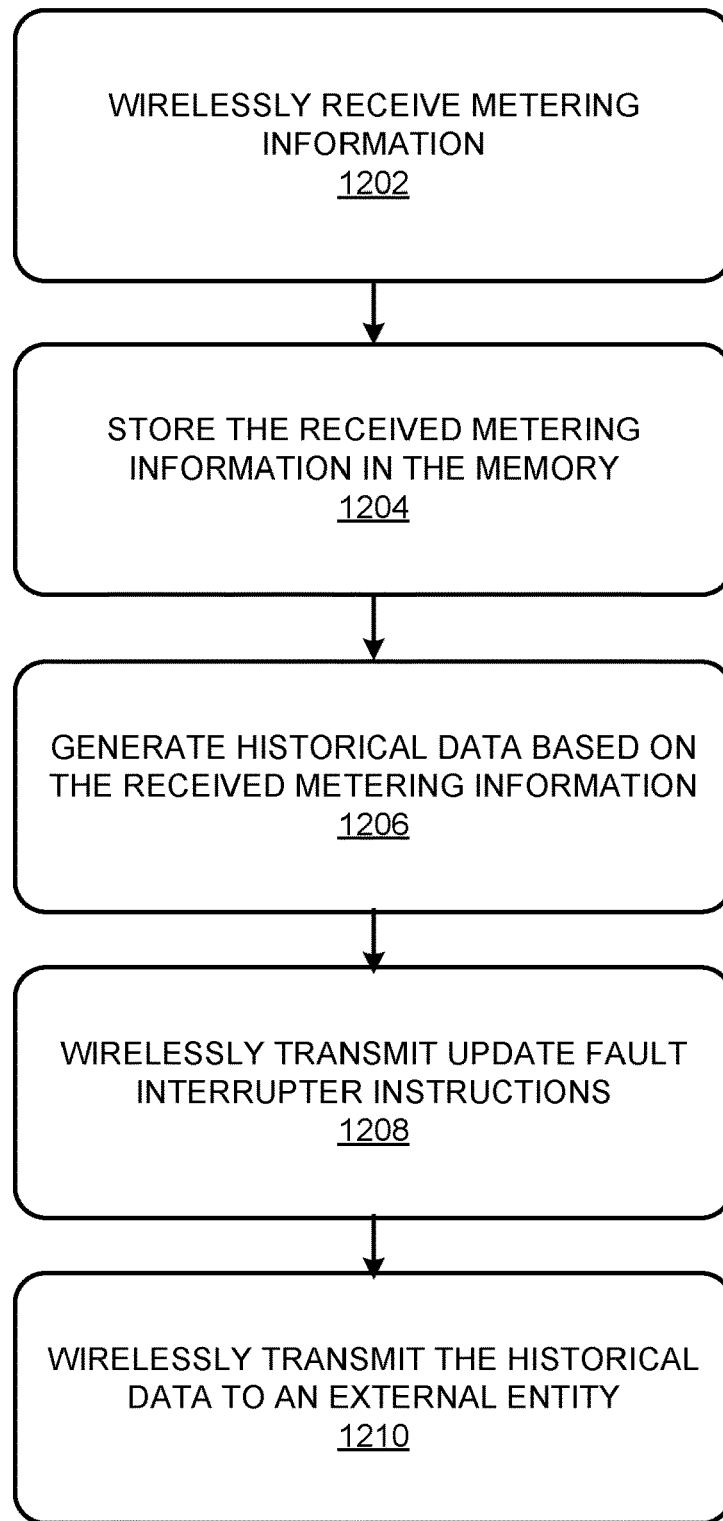
FIG. 12 illustrates a logic flow associated with a circuit breaker controller according to an exemplary embodiment.

FIG. 12 illustrates a logic flow 1200 associated with a circuit breaker controller (e.g., the circuit breaker controller 106). The logic flow 1200 may begin with block 1202. However, the logic flow 1200 may begin with a different block other than the block 1202. Furthermore, the logic flow 1200 is not illustrated in a particular order. A different order other than that illustrated may be used. Some or all of the communications and operations associated with the logic flow 1200 may be embodied as one or more computer executable instruction. Such computer executable instructions may be stored in the storage medium, such the memory 402, or a plurality of disparate storage mediums. A computing device, such as the processor 406, may execute the stored computer executable instructions.

At block 1202, a circuit breaker controller (e.g., the circuit breaker controller 106) wirelessly receives metering information from a communication enabled circuit breaker (e.g., the communication enabled circuit breaker 104). The metering information may be received from a plurality of communication enabled circuit breakers.

At block 1204, the circuit breaker controller stores the received metering information in a memory (e.g., the memory 402). In some implementations, the circuit breaker controller stores first and second metering information received from the communication enabled circuit breaker.

At block 1206, the circuit breaker controller generates historical data associated with the communication enabled circuit breaker based on the received first and second metering information. The historical data that relates to the metering information may be used in making a determination to: (1) update fault interrupter instructions associated with one or more communication enabled circuit breaker 104, (2) calibrate one or more communication enabled circuit breaker 104, (3) predict faults on branch circuits, (4) predict failure of loads coupled to branch circuits, etc.

At block 1208, based on the historical data, the circuit breaker controller wirelessly transmits updated fault interrupter instructions to the communication enabled circuit breaker.

At block 1210, the circuit breaker controller transmits the historical data to an entity (e.g., the mobile device 110, the computing device 112 and/or the Internet cloud 114) external to a circuit breaker panel housing the circuit breaker controller. As described, the historical data that relates to the metering information may be used in making a determination to: (1) update fault interrupter instructions associated with one or more communication enabled circuit breaker 104, (2) calibrate one or more communication enabled circuit breaker 104, (3) predict faults on branch circuits, (4) predict failure of loads coupled to branch circuits, etc.

FIG. 13 illustrates an embodiment of a storage medium 1300. The storage medium 1000 may comprise an article of manufacture. In some examples, the storage medium 1000 may include any non-transitory computer readable medium or machine readable medium, such as an optical, magnetic or semiconductor storage. The storage medium 1300 may store various types of processor executable instructions e.g., 1302). For example, storage medium 1300 can be coupled to processor(s) described herein (e.g., processor 212, processor 222, processor 312, processor 322, processor 406, processor 414-1, processor 414-2, etc.) while such processor(s) can be arranged to execute instructions 1302. Thus, the storage medium 1302 may store various types of computer executable instructions to implement logic flow 1100. The storage medium 1300 may store various types of computer executable instructions to implement logic flow 1200.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

While a wireless circuit breaker, a wireless circuit breaker controller, wireless technology enabled circuit breakers and methods for using the same have been described with reference to certain embodiments, it will be understood by those skilled in the art that various changes may be made, and equivalents may be substituted without departing from the spirit and scope of the claims of the application. Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

Furthermore, the following examples are provided to more fully described the embodiments of the present disclosure:

Example 1. A communicating circuit breaker for measuring and transmitting information related to power quality and metering data to a remote device, the communicating circuit breaker comprising: a line side phase connection; a load side phase connection; a conductive path configured to be selectively coupled between the line side phase connection and the load side phase connection; a circuit interrupter configured to selectively couple the conductive path; a Rogowski coil; a wireless radio; a memory having instructions stored therein; a processor in electrical communication with the circuit interrupter, the Rogowski coil, the wireless radio, and the memory; a sensor mount having a body portion and a clip portion, the body portion having a cavity configured to receive the Rogowski coil, the clip portion configured to secure the sensor mount to the conductive path; and shielding material configured to provide magnetic isolation between the Rogowski coil and one or more of the circuit interrupter, the processor, the memory, or the wireless radio, wherein the processor is configured to execute the instructions stored in the memory to collect information from the Rogowski coil and to control the wireless radio to communicate the information to the remote device.

Example 2. The communicating circuit breaker of example 1, wherein the body portion comprises a non-conductive material and the shielding material is applied to at least a portion of the body portion.

Example 3. The communicating circuit breaker of example 1, further comprising a second line side phase connection, a second clip and a second current sensor, the second clip coupled to the second line side phase connection, the second clip housing the second current sensor.

Example 4. The communicating circuit breaker of example 1, comprising a power supply electrically coupled to the line side phase connection, the Rogowski coil, the circuit interrupter, and the wireless radio.

Example 5. The communicating circuit breaker of example 1, further comprising a housing; wherein the Rogowski coil, the circuit interrupter, and the wireless radio are disposed within the housing; wherein the housing has a length, width, and height dimensions of no larger than 2 inches, no larger than 1¾ inches, and no larger than 1.14 inches, respectively.

Example 6. The communicating circuit breaker of example 1, further comprising: a housing; and a temperature sensor, wherein the Rogowski coil, the circuit interrupter, the wireless radio, and the temperature sensor are disposed within the housing, the temperature sensor arranged to measure a temperature within the housing.

Example 7. The communicating circuit breaker of example 1, wherein a portion of the conductive path has a longitudinal axis and the Rogowski coil has a central axis, wherein the sensor mount is secured to the conductive path such that the central axis is perpendicular to the longitudinal axis.

Example 8. A circuit breaker, comprising: a line side phase connection; a load side phase connection coupled to the line side phase connection; a fault interrupter configured to interrupt a current flow between the line side phase connection and the load side phase connection; a current sensor arranged proximate to the line side phase connection, the current sensor configured to measure a current; and a wireless radio coupled to the current sensor, the wireless radio to receive a signal from the current sensor to include an indication of the current measured by the current sensor and to send an information element including an indication of the current measured by the current sensor to a breaker controller.

Example 9. The circuit breaker according to example 8, comprising a memory including fault interrupter instructions, the fault interrupter coupled to the memory and arranged to interrupt the current flow between the line side phase connection and the load side phase connection based in part on the fault interrupter instructions.

Example 10. The circuit breaker according to example 8, the current sensor is a Rogowski coil.

Example 11. The circuit breaker according to example 10, comprising a clip coupled to the line side phase connection, the clip housing the Rogowski coil.

Example 12. The circuit breaker according to example 11, the clip comprising a plastic body in which the Rogowski coil is disposed, the plastic body comprising a shielding applied to at least a portion of an exterior surface of the plastic body.

Example 13. The circuit breaker according to example 11, comprising a second line side phase connection, a second clip and a second current sensor, the second clip coupled to the second line side phase connection, the second clip housing the second current sensor.

Example 14. The circuit breaker according to example 13, the second current sensor is a Rogowski coil.

Example 15. The circuit breaker according to example 8, comprising a power supply coupled to the line side phase connection, the current sensor, the fault interrupter, and the wireless radio, the power supply configured to source power from the line side phase connection and supply power to the current sensor, the fault interrupter and the wireless radio.

Example 16. The circuit breaker according to example 8, comprising a temperature sensor to measure at least in ambient air temperature proximate to the current sensor.

Example 17. A circuit breaker, comprising: first and second line side phase connections; first and second load side phase connections; a fault interrupter configured to interrupt a current flow between the first and second line side phase connections and a current flow between the first and second load side phase connections; a first shielded current sensor arranged proximate to the first line side phase connection, the first shielded current sensor configured to measure a current in the first line side phase connection; and a second shielded current sensor arranged proximate to the second line side phase connection, the second shielded current sensor configured to measure a current in the second line side phase connection.

Example 18. The circuit breaker according to example 17, comprising a wireless radio coupled to the first and second shielded current sensors, the wireless radio to receive signals from the first and second shielded current sensors, the signals to include an indication of the currents measured by the first and second shielded current sensors and to send an information element including the indication of the currents measured by the first and second shielding current sensors to a breaker controller.

Example 19. The circuit breaker according to example 17, comprising a memory including fault interrupter instructions, the fault interrupter coupled to the memory and arranged to interrupt the current flow between the first and second line side phase connections and the current flow between the first and second load side phase connections.

Example 20. The circuit breaker according to example 17, the first shielded current sensor comprises a first Rogowski coil and the second shielded current sensor comprises a second Rogowski coil.

Example 21. The circuit breaker according to example 20, comprising a first clip coupled to the first line side phase connection and a second clip coupled to the second line side phase connection, the first clip housing the first Rogowski coil and the second clip housing the second Rogowski coil.

Example 22. The circuit breaker according to example 21, each of the first and second clips comprising a plastic body, the plastic body comprising a shielding applied to at least a portion of an exterior surface of the plastic body, the shielding comprising a metallic material.

Example 23. A method of a wireless circuit breaker, comprising: sensing current in the wireless circuit breaker; sensing voltage in the wireless circuit breaker; obtaining metering information from at least the sensed current and the sensed voltage; and wirelessly transmitting the metering information.

Example 24. The method of the wireless circuit breaker according to example 23, the obtaining metering information comprising performing at least one calculation using at least the sensed current and the sensed voltage.

Example 25. The method of the wireless circuit breaker according to example 23, the sensed current comprising sensing a first current on a first line side phase connection and a second current on a second line side phase connection, a first shielded current sensor to sense the first current and a second shielded current sensor to sense the second current.

Example 26. The method of the wireless circuit breaker according to example 25, the first shielded current sensor is a first shielded Rogowski coil and the second shielded current sensor is a second shielded Rogowski coil.

Example 27. The method of the wireless circuit breaker according to example 23, the sensed current comprising sensing current on a line side phase connection, the current sensed with a Rogowski coil clipped to the line side phase connection.

Example 28. The method of the wireless circuit breaker according to example 27, the Rogowski coil housed in a plastic body comprising a shielding applied to at least a portion of an exterior surface of the plastic body.

Example 29. A method of a wireless circuit breaker controller, comprising: wirelessly receiving first and second metering information from a wireless circuit breaker; storing the first and second metering information from the wireless circuit breaker; generating historical data associated with the wireless circuit breaker based on at least the first and second metering information; and wirelessly transmitting updated fault interrupter instructions based on at least the historical data.

We claim:

1. A circuit breaker having N poles, the circuit breaker comprising:
   a housing comprising:
      a short side width corresponding to a number of poles, N, of the circuit breaker wherein N is at least two, and, for each of the N poles, the housing further comprising:
      a line side terminal;
      a load side terminal;
      a phase conductive path arranged and configured to establish electrical communication between the line side terminal and the load side terminal;

a current sensor arranged and configured to sense current in the phase conductive path;
a voltage sensor arranged and configured to sense voltage in the phase conductive path; and
a fault interrupter arranged and configured to selectively disconnect the phase conductive path;
a processor;
a memory configured to store fault instructions, the memory in electrical communication with the processor, wherein the processor is configured to store historical data in the memory, the historical data comprising:
  a plurality of current samples sensed by the current sensors and a plurality of corresponding voltage samples sensed by the corresponding voltage sensors; and
  a plurality of metering information calculations based on the plurality of current samples and the plurality of corresponding voltage samples;
a first wireless radio and a second wireless radio, the first and second wireless radios in electrical communication with the processor, wherein the first wireless radio is configured to communicate the historical data to a first remote device in accordance with a first wireless communication scheme, wherein the second wireless radio is configured to communicate to a second remote device in accordance with a second wireless communication scheme, wherein the first wireless communication scheme is different from the second wireless communication scheme;
wherein the first remote device is configured to:
  update the fault instructions based on the historical data; and
  communicate the updated fault instructions to the circuit breaker;
wherein the processor, and the first and second wireless radios of the circuit breaker remain powered by an electrical connection with at least one of the line side terminals while the phase conductive path is disconnected; and
wherein upon receipt of the updated fault instructions, the updated fault instructions are stored in the memory.

2. The circuit breaker of claim 1 wherein:
N is a positive integer equal to 2 or 3.

3. The circuit breaker of claim 2 wherein:
wherein each of the current sensors is in electrical communication with at least one of the first or second wireless radios.

4. The circuit breaker of claim 1, further comprising:
an antenna in electrical communication with at least one of the first or second wireless radios;
wherein the line side terminal for at least one of the N poles is in electrical communication with the memory, the fault interrupter, and the corresponding current sensor.

5. The circuit breaker of claim 1, further comprising shielding material configured to provide magnetic isolation between at least one of the current sensors and the fault interrupter, the processor, the memory, or the first or second wireless radio.

6. The circuit breaker of claim 1, further comprising an environmental sensor disposed within the housing, the environmental sensor arranged to measure a temperature within the housing, a humidity of within the housing, or a combination thereof.

7. The circuit breaker of claim 1, the housing having a rectangular face, the housing sized and configured to be installed in a circuit breaker panel, wherein the rectangular face has a width corresponding to a shorter side of the rectangular face, wherein the rectangular face is visible once the housing is installed in the circuit breaker panel.

8. The circuit breaker of claim 1, further comprising a neutral conductive path, wherein the current sensors measure current between the neutral conductive path and the corresponding phase conductive path.

9. The circuit breaker of claim 1, wherein the current sensor measures current between two of the N poles of the circuit breaker.

10. The circuit breaker of claim 1, wherein the second wireless radio is configured to communicate the historical data to the second remote device.

11. The circuit breaker of claim 10, further comprising a neutral conductive path, wherein the voltage sensor is configured to measure a voltage between the line side terminal and the neutral conductive path of the circuit breaker.

12. The circuit breaker of claim 11, further comprising a power supply to electrically couple to the processor, the memory, the current sensors, the voltage sensors, the fault interrupter, the first and second wireless radios, and the line side terminal.

13. A circuit breaker, comprising:
a N-pole housing comprising:
  a rectangular face wherein N is at least two, the N-pole housing sized and configured to be installed in a circuit breaker panel, wherein the rectangular face has a width corresponding to a shorter side of the rectangular face, wherein the rectangular face is visible once the N-pole housing is installed in the circuit breaker panel;
  a line side phase connection;
  a load side phase connection;
  a phase conductive path having an electrical connection between the line side phase connection and the load side phase connection;
  a current sensor arranged and configured to sense current in the phase conductive path;
  a voltage sensor arranged and configured to sense voltage in the phase conductive path;
  a fault interrupter configured to interrupt a current flow between the line side phase connection and the load side phase connection;
  a processor;
  a memory coupled with the processor;
  wherein the processor is configured to store historical data in the memory, the historical data comprising:
    a plurality of current samples sensed by the current sensor and a plurality of corresponding voltage samples sensed by the voltage sensor; and
    a plurality of metering information calculations based on the plurality of current samples and the plurality of corresponding voltage samples;
  a first wireless radio and a second wireless radio in electrical communication with the processor, wherein the first wireless radio is configured to communicate the historical data to a first remote device in accordance with a first wireless communication scheme, wherein the second wireless radio is configured to communicate to a second remote device in accordance with a second wireless communication scheme, wherein the first wireless communication scheme is different from the second wireless communication scheme; and
  wherein the processor, the first wireless radio, and the second wireless radio of the circuit breaker remain powered by an electrical connection with the line side phase connection while the phase conductive path is interrupted;

wherein the first remote device is configured to:
update the fault instructions based on the historical data; and
communicate updated fault instructions to the circuit breaker;
wherein upon receipt of the updated fault instructions, the updated fault instructions are stored in the memory.

14. The circuit breaker of claim 13, wherein the memory includes fault interrupter instructions, the fault interrupter coupled to the memory and arranged to interrupt the current flow between the line side phase connection and the load side phase connection based at least in part on the fault interrupter instructions.

15. The circuit breaker of claim 13, wherein the memory includes power metering instructions, the memory to execute the power metering instructions, the power metering instructions to cause the processor, when executed, to communicate the stored plurality of metering information calculations to the first, second, or both remote devices.

16. The circuit breaker of claim 13, further comprising shielding material configured to provide magnetic isolation between the current sensor, the fault interrupter, the first wireless radio, the second wireless radio, or a combination thereof.

17. The circuit breaker of claim 13, comprising an environmental sensor to measure at least an ambient air temperature proximate to the current sensor, a humidity in the housing, or a combination thereof.

18. A circuit breaker, comprising:
a housing comprising:
a side defining a width of the housing as no larger than an N-pole circuit breaker width, wherein the N-pole circuit breaker comprises one phase connection, two phase connections, or three or more phase connections;
a conductive path in electrical communication with one of the one phase connection, two phase connections, or three or more phase connections;
a fault interrupter configured to selectively connect and disconnect a conductive path;
an environmental sensor to sense an environmental parameter within the housing;
a current sensor arranged and configured to sense current in the conductive path;
a voltage sensor arranged and configured to sense voltage in the conductive path;
a processor;
a memory configured to store fault instructions, the memory in electrical communication with the processor;
wherein the processor is configured to store historical data, the historical data comprising:
a plurality of current samples sensed by the current sensor and a plurality of corresponding voltage samples sensed by the voltage sensor; and
a plurality of metering information calculations based on the plurality of current samples and the plurality of corresponding voltage samples;
a wireless radio in electrical communication with the processor, wherein the wireless radio is configured to communicate the historical data to a remote device;
wherein the wireless radio and the environmental sensor couple with the one phase connection, at least one of the two phase connections, or at least one of the three or more phase connections to remain powered while the conductive path is disconnected;
wherein the remote device is configured to:
update the fault instructions based on the historical data; and
communicate the updated fault instructions to the circuit breaker; and
wherein upon receipt of the updated fault instructions, the updated fault instructions are stored in the memory.

19. The circuit breaker of claim 18, wherein the environmental sensor is a temperature sensor.

20. The circuit breaker of claim 18, wherein the environmental sensor is a humidity sensor.

21. The circuit breaker of claim 18, further comprising a second wireless radio configured to communicate the historical data to a second remote device.

22. The circuit breaker of claim 18, wherein the conductive path is a phase conductive path and the circuit breaker further comprises a neutral conductive path, wherein the voltage sensor is configured to measure a voltage between the phase conductive path and the neutral conductive path.

* * * * *